United States Patent
Lim

(10) Patent No.: US 11,522,674 B1
(45) Date of Patent: Dec. 6, 2022

(54) ENCRYPTION, DECRYPTION, AND KEY GENERATION APPARATUS AND METHOD INVOLVING DIOPHANTINE EQUATION AND ARTIFICIAL INTELLIGENCE

(71) Applicant: Aires Investment Holdings Private Limited, Singapore (SG)

(72) Inventor: Meng Liang Lim, Singapore (SG)

(73) Assignee: Aires Investment Holdings Private Limited, Singapore (SG)

( * ) Notice: Subject to any disclaimer, the term of this patent is extended or adjusted under 35 U.S.C. 154(b) by 0 days.

(21) Appl. No.: 17/833,881

(22) Filed: Jun. 6, 2022

(30) Foreign Application Priority Data

Sep. 9, 2021 (SG) .......................... 10202109894Y

(51) Int. Cl.
  *H04L 9/06* (2006.01)
(52) U.S. Cl.
  CPC .................................. *H04L 9/0618* (2013.01)
(58) Field of Classification Search
  CPC ..... H04L 9/0618; H04L 9/0637; H04L 9/065; H04L 9/08; H04L 9/0816; H04L 9/06
  See application file for complete search history.

(56) References Cited

U.S. PATENT DOCUMENTS

| | | | |
|---|---|---|---|
| 2002/0152252 A1 | 10/2002 | Kaminaga | |
| 2006/0251247 A1* | 11/2006 | Akiyama | H04L 9/3026 380/28 |
| 2011/0047201 A1* | 2/2011 | Macready | B82Y 10/00 708/446 |
| 2015/0046708 A1 | 2/2015 | Yasuda | |
| 2022/0085973 A1* | 3/2022 | Honorio Araujo da Silva | H04L 9/3093 |

OTHER PUBLICATIONS

Akiyama K. et al., A Public-key Encryption Scheme Based on Non-linear Indeterminate Equations (Giophantus), Cryptology ePrint Archive, Dec. 19, 2017, Report 2017/1241, 52 pages.
Abraham S. et al., A Connectionist Network Approach to Find Numerical Solutions of Diophantine Equations, arXivLabs, Jun. 9, 2012, arXiv:1206.1971, 7 pages.
Abraham S. et al., Reciprocally Induced Coevolution: A Computational Metaphor in Mathematics. arXivLabs, Jun. 5, 2012, arXiv:1206.1247, 11 pages.

* cited by examiner

*Primary Examiner* — Quazi Farooqui
(74) *Attorney, Agent, or Firm* — Bochner IP, PLLC; Serge Krimnus

(57) ABSTRACT

Embodiments of the invention relate to symmetric encryption that converts plain text to Diophantine equations, i.e. cipher text, and creates a symmetric key which is held by a sender (or encryption apparatus) and a recipient (or decryption apparatus). The key is used by the decryption apparatus to decrypt the Diophantine equations, and convert them to original plain text. Particularly, undecidable encryption and artificial intelligence (AI) are employed in combination. More particularly, the AI would exclude any class of Diophantine equations which has been solved or deciphered without key, or known to be solvable. In the event certain classes of Diophantine equations are solved in the future, the AI will exclude the use of these solved or solvable classes of Diophantine equation in encryption.

34 Claims, 5 Drawing Sheets

ENCRYPTION, DECRYPTION, AND KEY GENERATION APPARATUS AND METHOD INVOLVING DIOPHANTINE EQUATION AND ARTIFICIAL INTELLIGENCE

FIELD OF THE INVENTION

Embodiments of the invention relate to symmetric key generation, encryption, and decryption which use insolvable Diophantine equation(s) as cipher text.

BACKGROUND

Cryptographic technology is normally classified into symmetric key encryption and public key encryption (or asymmetric key encryption). In symmetric key encryption, a sender and a recipient share the same key to encrypt and decrypt messages. In public key encryption, a sender and a recipient hold a public key and private key respectively, whereby the public key is accessible to all parties. The sender usually uses the public key to encrypt a message which only the recipient with a private key can decrypt.

Cryptography method and apparatus using Diophantine equations have been proposed, such as in US 2006/0251247 A1 (Akiyama et al.) and Giophantus™ public-key cryptosystem by Toshiba Corporation. However, such previously proposed cryptography method and apparatus were designed for public key encryption.

SUMMARY

According to a first aspect of the invention, an encryption method is provided which comprises:
receiving at least one plain text;
converting the at least one plain text to at least one pre-encryption integer $(M_1, \ldots, M_n)$;
using the at least one pre-encryption integer $(M_1, \ldots, M_n)$ and at least one variable solution set $(v_1, \ldots, v_n)$ derived from at least one symmetric key, generating at least one Diophantine equation solvable by the at least one variable solution set including:
using a first subset of the at least one variable solution set $(v_1, \ldots, v_n)$, generating at least one initial Diophantine equation; and
using a concealment variable derived from a second subset of the at least one variable solution set $(v_1, \ldots, v_n)$, modifying the at least one initial Diophantine equation to generate the at least one Diophantine equation;
predicting, using a trained AI model, insolvability or solvability of the at least one Diophantine equation; and
providing the at least one Diophantine equation as at least one cipher text if the at least one Diophantine equation is predicted, by the trained AI model, as insolvable.

Embodiments of the first aspect are provided as recited in claim 2 to claim 8.

According to a second aspect of the invention, an encryption apparatus is provided which comprises:
at least one memory unit for storing computer-executable instructions; and
at least one processor communicably coupled to the at least memory unit and configured to: execute the computer-executable instructions to perform the method according to any one of claim 1 to claim 8.

According to a third aspect of the invention, a non-transitory, computer readable medium is provided which comprises computer-executable instructions configured to direct at least one computer processor to perform the method according to any one of claim 1 to claim 8.

According to a fourth aspect of the invention, an encryption apparatus is provided which comprises:
a plain text input unit configured to receive at least one plain text;
a symmetric key input unit configured to receive at least one symmetric key;
a plain text to integer unit communicably coupled to the plain text input unit and configured to: receive the at least one plain text from the plain text input unit and convert the at least one plain text to at least one pre-encryption integer $(M_1, \ldots, M_n)$;
a polynomial generation unit communicably coupled to the symmetric key unit and configured to: receive the at least one symmetric key from the symmetric key unit and derive at least one variable solution set $(v_1, \ldots, v_n)$ using the at least one symmetric key;
an encryption unit communicably coupled to the plain text to integer unit, the polynomial generation unit, wherein the encryption unit is configured to: receive the at least one variable solution set $(v_1, \ldots, v_n)$ from the polynomial generation unit, and generate at least one Diophantine equation solvable by the at least one variable solution set $(v_1, \ldots, v_n)$ using the at least one pre-encryption integer $(M_1, \ldots, M_n)$ and the at least one variable solution set $(v_1, \ldots, v_n)$ by being configured to: generate at least one initial Diophantine equation using a first subset of the at least one variable solution set $(v_1, \ldots, v_n)$, and modify the at least one initial Diophantine equation using a concealment variable which is derived from a second subset of the at least one variable solution set $(v_1, \ldots, v_n)$, and
an AI unit communicably coupled to the encryption unit and configured to: receive the at least one Diophantine equation, the AI unit having a trained AI model configured to: predict insolvability or solvability of the at least one Diophantine equation,
wherein the encryption unit is further communicably coupled to a cipher text output unit and configured to: provide the at least one Diophantine equation as at least one cipher text to the cipher text output unit if the at least one Diophantine equation is predicted as insolvable by the AI model.

Embodiments of the fourth aspect are provided as recited in claim 12 to claim 18.

According to a fifth aspect of the invention, a decryption method is provided which comprises:
receiving at least one cipher text which includes at least one Diophantine equation;
using a symmetric key, deriving at least one variable solution set $(v_1, \ldots, v_n)$ for solving the at least one Diophantine equation;
using the at least one variable solution set $(v_1, \ldots, v_n)$, solving the at least one Diophantine equation and thereby to ascertaining at least one pre-encryption integer $(M_1, \ldots, M_n)$, including:
using a first subset of the at least one variable solution set $(v_1, \ldots, v_n)$, ascertaining the at least one initial integer; and
using a concealment variable derived from a second subset of the at least one variable solution set $(v_1, \ldots, v_n)$, modifying the at least one initial integer to ascertain the at least one pre-encryption integer $(M_1, \ldots, M_n)$, and
converting the at least one pre-encryption integer $(M_1, \ldots, M_n)$ to at least one plain text.

Embodiments of the fifth aspect are provided as recited in claim 20 to claim 25.

According to a sixth aspect of the invention, a decryption apparatus is provided which comprises:
at least one memory unit for storing computer-executable instructions; and
at least one processor communicably coupled to the at least memory unit and configured to: execute the computer-executable instructions to perform the method according to any one of claim 19 to claim 25.

According to a seventh aspect of the invention, a non-transitory, computer readable medium is provided which comprises computer-executable instructions configured to direct at least one computer processor to perform the method according to any one of claim 19 to claim 25.

According to an eighth aspect of the invention, a decryption apparatus is provided which comprises:
a cipher text input unit configured to receive at least one cipher text which includes at least one Diophantine equation;
a symmetric key input unit configured to receive at least one symmetric key;
a decryption unit communicably coupled to the cipher text input unit and the symmetric key input unit, and configured to:
receive the symmetric key from the symmetric key input unit and the at least one Diophantine equation from the cipher text input unit;
using the symmetric key, derive at least one variable solution set $(v_1, \ldots, v_n)$ for solving the at least one Diophantine equation;
using the at least one variable solution set $(v_1, \ldots, v_n)$, solve the at least one Diophantine equation to ascertain at least one pre-encryption integer $(M_1, \ldots, M_n)$ by being configured to:
using a first subset of the at least one variable solution set $(v_1, \ldots, v_n)$, ascertain at least one initial integer;
using a concealment variable derived from a second subset of the at least one variable solution set $(v_1, \ldots, v_n)$, modify the at least one initial integer to ascertain the at least one pre-encryption integer $(M_1, \ldots, M_n)$; and
an integer to plain text unit communicably coupled to the decryption unit and configured to:
receive the at least one pre-encryption integer $(M_1, \ldots, M_n)$ from the decryption unit, and convert the at least one pre-encryption integer $(M_1, \ldots, M_n)$ to at least one plain text.

Embodiments of the eighth aspect are provided as recited in claim 29 to claim 34.

BRIEF DESCRIPTION OF DRAWINGS

Embodiments of the invention will be described in detail with reference to the accompanying drawings, in which.

DETAILED DESCRIPTION

Figure 1:
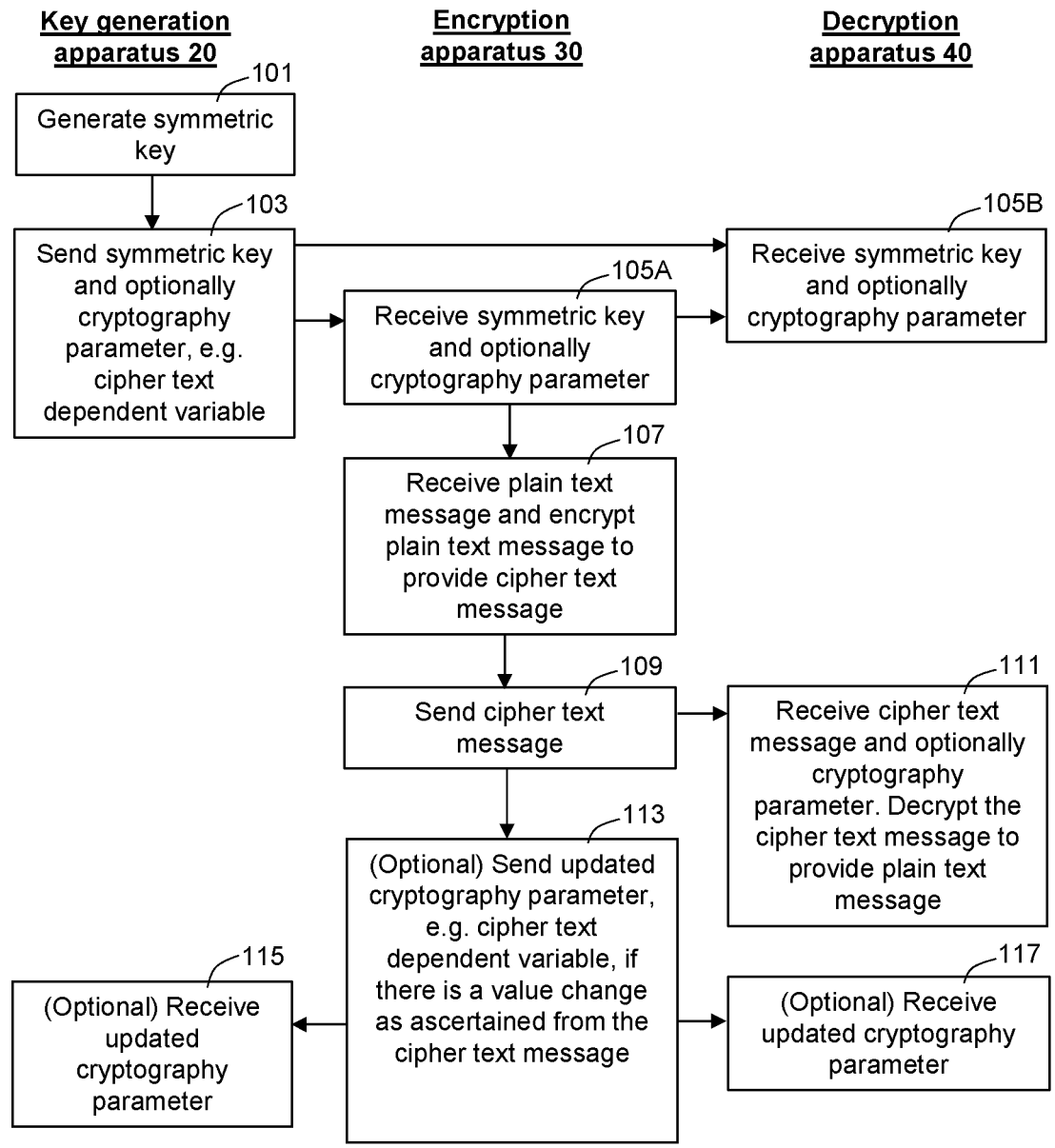
FIG. 1 is a simplified flow chart showing message exchanges among a key generation apparatus, an encryption apparatus, and a decryption apparatus.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference labels or numerals refer to same or similar functionalities or features throughout the several views. In the drawings, directional arrows shown between features illustrate data or information transfer therebetween in accordance with description of some embodiments but are not limited as such. In other words, data or information transfer in reverse to the directional arrows and/or not shown by directional arrow among features may be envisaged and are not shown to avoid obscuring description of the embodiments.

Embodiments described in the context of one of the apparatuses or methods are analogously valid for the other apparatuses or methods. Similarly, embodiments described in the context of an apparatus are analogously valid for a method, and vice versa.

Features that are described in the context of an embodiment or example may correspondingly be applicable to the same or similar features in the other embodiments or examples. Features that are described in the context of an embodiment or example may correspondingly be applicable to the other embodiments or examples, even if not explicitly described in these other embodiments or examples. Furthermore, additions and/or combinations and/or alternatives as described for a feature in the context of an embodiment or example may correspondingly be applicable to the same or similar feature in the other embodiments or examples.

It should be understood that the articles "a", "an" and "the" as used with regard to a feature or element include a reference to one or more of the features or elements. The term "and/or" includes any and all combinations of one or more of the associated feature or element. The terms "comprising", "including", "having", "involving" and any of their related terms, as used in description and claims, are intended to be open-ended and mean that there may be additional features or elements other than the listed ones. Identifiers such as "first", "second", "third", and so on, are used merely as labels, and are not intended to impose numerical requirements on their objects, nor construed in a manner imposing any relative position or time sequence between limitations.

The term "coupled" and related terms are used in an operational sense and are not necessarily limited to a direct physical connection or coupling. Thus, for example, two devices may be coupled directly, or via one or more intermediary devices. Based on the present disclosure, a person of ordinary skill in the art will appreciate a variety of ways in which coupling exists in accordance with the aforementioned definition.

Mathematical notations used herein are generally well-known. For avoidance of doubt, example notations are described as follows. The notation A is used to denote power of. For example, A^b=$A^b$. For example, x^2=(x)(x)=$x^2$. The notation · or * is used to denote multiplication. For example, A·B=A*B. For example, A/B=A÷B. The notation/is used to denote division. For example, A/B=A÷B. The notation ∈ is used to denote element of. The notation ⇒ is used to denote implication symbol. For example, A⇒B represents A is true implies B is true. The notation { } is used to denote a specific domain of elements. The notation π is used to denote product function.

Introduction

Diophantine equations are algebraic equations for which only integer solutions are allowed. Unlike certain other mathematical or algebraic equations which may be solved by a general method or algorithm, different types of Diophantine equations may require different methods to solve. Hence, mathematicians had studied whether a general method to solve all Diophantine equations exists. According to Matiyasevich Theorem/MRDP Theorem, however, it was found there exists no general method or algorithm to solve all Diophantine equations which therefore are an undecidable problem. As such, it is presently impossible to use mathematical methods to determine the solvability of Diophantine equations in general.

Undecidable encryption refers to two-way encryption and decryption method whereby without a key, the only general method to decipher the encrypted cipher text is to solve an undecidable problem that requires either infinitely many algorithms and/or exist no general algorithm to solve. Hence, given the fact that there exists no general method or algorithm to solve an undecidable problem, for any class of cipher text that has been deciphered without key, there will remain infinitely many classes of cipher text which require infinitely many algorithms or methods to solve, and/or there will be finitely or infinitely many classes of cipher text which no method or algorithm can solve.

In view of the above, a general limitation of the Diophantine equation encryption is the lack of knowledge regarding which Diophantine equations are solvable and which are unsolvable. For example, one would know that irreducible polynomials and non-linear Diophantine equations make good candidates for unsolvable Diophantine equations, however it is not true that all irreducible and non-linear Diophantine equations are unsolvable.

Artificial intelligence (AI) enables learning from data and thus making predictions in an independent manner. However, AI has limited memory and generally requires boundaries and a fixed set of rules to function. In the context of undecidable encryption, the boundaries and rules are the boundaries and rules of the undecidable problem.

In view of the above and other issues, the invention employs undecidable encryption and AI, in combination. Such combination would change or evolve over time and get stronger by suitable training. Particularly, AI would exclude the generation of any class of cipher text that has been deciphered without key. Hence in context of Diophantine equations encryption, based on historical data of Diophantine equations that have been solved, AI would exclude any class of Diophantine equations, i.e. cipher text, which has been solved or deciphered without key, or known to be solvable. More particularly, when the encryption is paired with AI, only unsolved or unsolvable Diophantine equations based on known historical data will be used for encryption. In the event certain classes of Diophantine equations are solved in the future, the AI will exclude the use of these solved or solvable classes of Diophantine equation in encryption.

Polynomial Generation

Polynomial generation for constructing Diophantine equation from integers is explained herein with reference to non-limiting example(s).

Example 1

Let $v_n$ denote the variables of a Diophantine equation, and let a symmetric key be denoted by $[y_1, y_2, y_3, z_1, z_2, z_3]$, variables $v_n$ may be defined as the following to provide a variable solution set $(v_1, v_2, v_3, \ldots, v_n)$ to solve a Diophantine equation:

When $0<n<4$, $v_1 = y_1 + 10^{z_1}$ $v_2 = y_2 + 10^{z_2}$ $v_3 = y_3 + 10^{z_3}$ When $n \geq 4$, $v_n = n + y_1 + y_2 + y_3$ Let $y_1=1, y_2=2, y_3=3, z_1=1, z_2=2, z_3=3$ and based on the above definition, $v_1=11, v_2=102, v_3=1003$.

Let integer X=10000, X may be expressed in the following ways or Diophantine equations:

$X = (v_1)^2 + (v_2)^2 + (v_3)^2 - 1006534$ or $X = (v_2)^3 - (v_3)^2 + 20(v_1)^2 - 47619$ or $X = 10(v_3) + v_2 + v_1 - 143$

In view of the above, there are numerous ways X can be expressed in terms of $v_1, v_2, v_3$. In other words, X can be expressed by numerous Diophantine equations and the symmetric key may generate more than one variable solution set $(v_1, \ldots, v_n)$ and infinitely many variables with a symmetric key having finite number of integers, Diophantine equations may have infinitely many solutions.

Undecidability of Diophantine Equations

Undecidability of Diophantine equations is explained herein with reference to non-limiting example(s).

Example 2

Find all integer solutions to the equation:

$a^n + b^n = c^n$

Given that $0 \leq a \leq 2, 0 \leq b \leq 2, 0 \leq c \leq 2, n=3$, by trial and error, it is obtained that a=b=c=0 is a solution to the equation above and it can shown that there is no positive integer solution. In this equation there are a total of 27 cases, hence it is decidable by trial and error.

Suppose the question is rephrased and the bounds on a, b, c, n are removed, and let a, b, c, n∈N, find all positive integer solutions to the equation:

$a^n + b^n = c^n$

This famous equation is known as Fermat's last theorem and baffled mathematicians for over 300 years until it was solved by Andrew Wiles in 1995.

Here, in this example, it can be clearly seen that by removing the bounds on the variables a, b, c, n, the trial and error method will no longer work and it becomes harder to reach a conclusion.

However, as the equation has been solved, it is considered decidable as there exist a method to ascertain if there are integer solutions to $a^n+b^n=c^n$.

Unsolvable Diophantine Equations

Generation of unsolvable Diophantine equations is explained herein with reference to non-limiting example(s).

In Example 2, an example of Diophantine equation is provided and boundaries of the variables are discussed. Suppose polynomial Diophantine equations are generated as per Example 1, as follows:

$$X=(v_1)^2+(v_2)^2+(v_3)^2-1006534$$

$$X=(v_2)^3-(v_3)^2+20(v_1)^2-47619$$

$$X=10(v_3)+v_2+v_1-143$$

it would be obvious to others reading the cipher text that these equations have an integer solution, if they are used without modification.

Hence, it may be necessary to conceal the true equation with another variable, e.g. concealment variable, this is an important step to create an undecidable encryption.

The above equations may be modified by adding variable $v_4$ to the right hand side of the equation. Let $v_4=20000$, the equations of Example 1 may be modified as follows:

$$X=(v_1)^2+(v_2)^2+(v_3)^2-1026534$$

$$X=(v_2)^3-(v_3)^2+20(v_1)^2-67619$$

$$X=10(v_3)+v_2+v_1-20143$$

It has thus become possible that the equations, after modification, have no integer solution.

However, as X remains a linear term, it is always possible that an integer solution is found.

For example, in $X=(v_1)^2+(v_2)^2+(v_3)^2-1026534$, let $v_1=v_2=v_3=1$, then $X=-1026531$.

However, if X is converted into a non-linear term, and given that $v_1=11$, the equation $X=(v_1)^2+(v_2)^2+(v_3)^2-1006534$ may be modified as follows:

$$(v_1)X=(v_1)^3+11(v_2)^2+11(v_3)^2-11091874$$

$$(v_1)^2(X)^2=10000[(v_1)^4+121(v_2)^2+121(v_3)^2-121810614]$$

With variables that have higher degrees of power, each Diophantine equation becomes more complex and is non-obvious whether there is an integral solution. In view of the above, generation of polynomials is a multifaceted process and there are always numerous methods to generate different kind of polynomials.

Unbounded Variables Based on Finite Key Size

Generation of unbounded variables based on finite key size is explained herein with reference to non-limiting example(s).

Symmetric encryption keys have finite length sizes, defined normally in bits, with key sizes normally having 128, 192 or 256-bit size. A 128-bit key size key will have $2^{128}$ different combinations of key size while a 256-bit key size will have $2^{256}$ key size. Suppose the key size is 128 and given 4 variables $v_1$, $v_2$, $v_3$, $v_4$, suppose the variables are represented by integers from 1 to $2^{32}$ and 32 bits key size are allocated to each variable, there are a total of $(2^{32})^4$ or $2^{128}$ different combinations, however the variables are still bounded by $2^{32}$, e.g.

$$Max[v_1]=2^{32}$$

$$Max[v_2]=2^{32}$$

$$Max[v_3]=2^{32}$$

$$Max[v_4]=2^{32}$$

To create an undecidable encryption, variables with a maximum integer value cannot be used. Hence, instead of letting the variables be represented by integers directly, the symmetric key is used to construct integers. For example, with a 32-bit key length split into 2 variables $y_1$, $z_1$ of 16-bit each, the following can be constructed:

$$v_1=y_1+(100000000)^{z_1}$$

The maximum value of $v_1$ is then $65536+(100000000)^{65536}$ which is a significantly higher value than $2^{32}$ or 4294967296. However, the problem still remains despite the vast increased in boundaries and integer range that the variable can represent; in other words, there is still a maximum value on the variables.

The aforementioned problem may be solved with introduction of a cipher text dependent variable, K, which is dependent on the cipher text. Depending on the cipher text exchanged, value of cipher text variable, K, may or may not change.

Example 3

Let initial value of K=10.
In cipher text 1 below, the value of K is unchanged.

$$X=(v_1)^2+(v_2)^3+1000(v_3)^5-25020$$

In cipher text 2 below, the value of K has changed from 10 to 1000, as cipher text 2 contains the variable 1000 $(v_3)^{10}$.

$$X=(v_1)^2+(v_2)^3+1000(v_3)^{10}-25020$$

In general, for any value of the cipher text dependent variable, K=C, the value of C is changed from C to A if and only if there is a variable in the Diophantine equation cipher text with polynomial degree C. and coefficient A.

In view of the above, using the symmetric key and cipher text dependent variable to construct variables will allow the variables constructed to be unbounded. This is an important feature for undecidable encryption methods.

In general, given $v_n$ is an integer constructed with integers including K, there exists $v_n$ such that $-\infty<K<\infty \Rightarrow -\infty<v_n<\infty$ [K is unbounded implies that there exists an integer constructed with K that is unbounded]. $K \in Z \Rightarrow v_n \in Z$ is an important condition for the usage of the cipher dependent variable. In practice, bounds may be introduced on the variables to speed up the process of encryption and decryption, however the limitations will be imposed by a lack of computing power rather than by design.

Integer Partitioning Using Addition, Subtraction, Multiplication

Generation of a chosen number of Diophantine equations per encryption using integer partition method(s) is explained herein with reference to non-limiting example(s).

An integer may be partitioned by addition and/or subtraction. For example, an integer X=10000 may be partitioned or expressed by X=5000+1000+6000−2000, thereafter the partitioned integers 1000, 2000, 5000, and 6000 may be expressed as Diophantine equations. One limitation of this partitioning method is that the process can be reversed by combining the equations into a single equation.

An integer may be partitioned by multiplication. For example, an integer X=10000 may be partitioned or expressed by factorization X=10*10*100, thereafter the partitioned integers 10, and 100 may be expressed as Diophantine equations. One limitation of this partitioning method is that when X is a prime number, the method will not work and furthermore the Diophantine equation generated will be a reducible Diophantine equation and may be solvable.

Integer Partitioning Using Relatively Prime Coordinates

Prime Sets and Prime Coordinates

Often in mathematics, numbers are described as belonging to the set of natural numbers $\{N\}$ or $\{Z\}$ integers. However, upon closer inspection of the properties of numbers, it is also possible to describe numbers as belonging to Prime Sets which will be denoted as $\{P_x\}$ in this disclosure.

Definition 1: Prime Sets

Let $\{P_x\}$ denote the set of natural numbers from $\{1, 2, 3, 4 \ldots \pi P_n\}$
$$\overset{n=x}{\underset{n=1}{}}$$

where P is the series of prime numbers and $P_1=2$, $P_2=3$, $P_3=5$, $P_4=7$

For example $\{P_5\}$ will denote the set of natural numbers from 1 to 2310. ($2310=2\cdot3\cdot5\cdot7\cdot11$)

$\{P_6\}$ will denote the set of natural numbers from 1 to 30030 ($30030=2\cdot3\cdot5\cdot7\cdot11\cdot13$)

Definition 2: Prime Coordinates

For any $\{P_x\}$ there will be x coordinates.

For any natural number $N\in\{P_x\}$ its coordinates are defined by:

($N$ mod $P_1$, $N$ mod $P_2$, $N$ mod $P_3$ ... $N$ mod $P_x$) where mod is the modulo operation, and $N$ mod $P_1$ denotes the remainder of N divided by 2.

Proof 1: Proof by Contradiction

Statement:

For any $\{P_x\}$ there are $\overset{n=x}{\underset{n=1}{\pi P_n}}$ unique coordinates and for any natural number $N\in\{P_x\}$ has unique prime coordinates.

Suppose there is $N_1\in\{P_x\}$ and $N_2\in\{P_x\}$ such that $N_1\neq N_2$ and $N_1$ and $N_2$ have the same prime coordinates, i.e., $$N_1 \bmod P_1 = N_2 \bmod P_1$$

$$N_1 \bmod P_2 = N_2 \bmod P_2$$

$$N_1 \bmod P_x = N_2 \bmod P_x$$

Let $|N_1-N_2|=N_3$ $N_3$ mod $P_1=0$, $N_3$ mod $P_2=0$ .... $N_3$ mod $P_x=0$ the smallest non-zero integer divisible by 2, 3, 5, 7 ... $P_x$ is $2\cdot3\cdot5\cdot7\cdot11\cdot13 \ldots P_x$.

$\overset{n=x}{\underset{n=1}{\pi P_n}} \leq N_3$, $|N_1-N_2| < \overset{n=x}{\underset{n=1}{\pi P_n}}$ since $N_1\in\{P_x\}$, $N_2\in\{P_x\}$ hence there is a contradiction, therefore each natural number $N \in \{P_x\}$ has unique prime coordinates.

The Prime Coordinates Function

A trivial example would be (1,1,1,1,1,1) which would denote the natural number 1 regardless of the number of coordinates.

(1,1,1,1,1,1)=(1,1,1,1,1,1,1,1,1)=(1,1,1,1,1,1,1,1,1,1,1,1,1,1,1)=1

Another trivial example would be:

(0,2)=(0,2,2,2,2,2,2)=(0,2,2,2,2,2,2,2,2,2,2,2,2,2,2,2,2)=2 since 1 mod $P_x=1$ for any prime number and 2 mod $P_x=2$ for any prime number greater than 2.

Representation of prime coordinate (1,2,3,4,5,6,) may be ascertained as follows. Using the function requires the solving of multiple Diophantine equations, in particular for the above example:

Let (1,2,3,4,5,6)=X

By definition of the function, $$X \bmod 2 = 1$$

$$X \bmod 3 = 2$$

$$X \bmod 5 = 3$$

$$X \bmod 7 = 4$$

$$X \bmod 11 = 5$$

$$X \bmod 13 = 6$$

An integral solution for the following Diophantine equations has to be found.

Let $n_1$, $n_2$, $n_3$, $n_4$, $n_5$, $n_6$ be integers, $$X=2n_1+1$$

$$X=3n_2+2$$

$$X=5n_3+3$$

$$X=7n_4+4$$

$$X=11n_5+5$$

$$X=13n_6+6$$

Two problems naturally arise from the solving of Diophantine equations: (i) does an integral solution exist? (ii) How to derive an integral solution?

Proof 2:

Statement:

An integral solution exists for any set of linear Diophantine equations with 2 variables in the format if $k_1$, $k_2$, $k_3$ ... are prime numbers.

$$X=k_1y+z_1, X=k_2y+z_2, X=k_3y+z_3$$

where $k_1$, $k_2$, $k_3$ ... and $z_1$, $z_2$, $z_3$ ... are integers

Proof 1 has shown that:

For any $\{P_x\}$ there are $\overset{n=x}{\underset{n=1}{\pi P_n}}$ unique coordinates and for any natural number $N\in\{P_x\}$ has unique prime coordinates.

Given the following 2 conditions, it can be proved by contradiction and pigeon hole principal:

(1) For any set $\{P_x\}$ there are exactly $\overset{n=x}{\underset{n=1}{\pi P_n}}$ natural numbers and $\overset{n=x}{\underset{n=1}{\pi P_n}}$ coordinates, (2) For any natural number $N\in\{P_x\}$, there exist unique coordinates Suppose there exists a prime coordinate function with x coordinates and set a of corresponding Diophantine equations with no integral solution, then there exists a maximum of $\overset{n=x}{\underset{n=1}{\pi P_n}}-1$ coordinates when there are $\overset{n=x}{\underset{n=1}{\pi P_n}}$ natural numbers This implies there exist one or more numbers $N \in \{P_x\}$ that has the same coordinates by the pigeon hole principal thus contradicting Proof 1.
Hence, the statement is true.

Solving for the Diophantine equations, the number 29243 is derived.

$(1,2,3,4,5,6) = 29243$ $29243 \mod 2 = 1$ $29243 \mod 3 = 2$ $29243 \mod 5 = 3$ $29243 \mod 7 = 4$ $29243 \mod 11 = 5$ $29243 \mod 13 = 6$ Prime Vectors
Representation of $(1,0,0,0)$, $(0,1,0,0)$, $(0,0,1,0)$, $(0,0,0,1)$ may be as follows.
In this case $\{P_4\}$ represents the set of natural numbers up to 210

$(1,0,0,0) = 105$ $(0,1,0,0) = 70$ $(0,0,1,0) = 126$ $(0,0,0,1) = 120$

Now then $(1,2,3,4) = [105 + 2(70) + 3(126) + 4(120)] \mod 210 = 1103 \mod 210 = 53$ The number 53 can be represented as $(1,2,3,4,9)$ or $(1,2,3,4,9,1)$, etc.

Determining Prime Vectors
For any prime vector coordinate $(0,0,1)$ with x terms and 1 on the $Z^{th}$ coordinate, is equal to:

$$\sum_{n=1}^{n=x} \pi(P_n) \cdot (K_1)/P_z$$

where $K_1$ is any integral solution to x in the Diophantine equation $$\sum_{n=1}^{n=x} \pi(P_n)/P_z \mod P_z \cdot x = (P_z)y + 1$$

For convenience of calculation, let $K_1$ be the smallest positive integral solution such that $0 < K_1$.

Example 4: Determine the Value of $(0,0,1,0,0)$, $P_z = P_3 = 5$, $X = 5$ $$\sum_{n=1}^{n=x} \pi(P_n)/P_z = 2 \cdot 3 \cdot 7 \cdot 11 = 462$$

$462 \mod 5 = 2$

The integral solution to the Diophantine equation $2x = 5y + 1$ will be $x=3$, $y=1$, let $K_1 = 3$ $$\sum_{n=1}^{n=x} \pi(P_n) \cdot (K_1)/P_z = 2 \cdot 3 \cdot 5 \cdot 7 \cdot 11 \cdot (3/7) = 462 \cdot 3 = 1386$$

Example 5: Determine the Value of $(0,0,0,0,0,0,1)$, $P_z = P_7 = 17$, $X = 7$ $$\sum_{n=1}^{n=x} \pi(P_n)/P_z = 2 \cdot 3 \cdot 5 \cdot 7 \cdot 11 \cdot 13 = 30030$$

$30030 \mod 17 = 8$

The integral solution to the Diophantine equation $8x = 17y + 1$ will be $x=15$, $y=7$, let $K_1 = 15$ $$\sum_{n=1}^{n=x} \pi(P_n) \cdot (K_1)/P_z = 2 \cdot 3 \cdot 5 \cdot 7 \cdot 11 \cdot 13 \cdot 17 (15/17) = 30030(15) = 450450$$

Determining Prime Coordinates
Prime coordinates can be added, subtracted or multiplied with rules determined by the modulo operation.
For example, it has been determined from the above $(0,0,0,0,0,0,1) = 450450$
Note that:

$$\sum_{n=1}^{n=x} \pi(P_n) = 2 \cdot 3 \cdot 5 \cdot 7 \cdot 11 \cdot 13 \cdot 17 = 510510$$

And for $(0,0,0,0,0,0,2)$, $(0,0,0,0,0,0,3) \in \{P_7\}$, $(0,0,0,0,0,0,2), (0,0,0,0,0,0,3) \leq 510510$, $(0,0,0,0,0,0,2) = 450450(2) \mod 510510 = 900900 \mod 510510 = 390390$ $(0,0,0,0,0,0,3) = 450450(3) \mod 510510 = 1351350 \mod 510510 = 330330$ Properties of Prime Vectors
The properties of prime vectors are similar to the properties of the modulo operation
(1) Associative $X_1 \mod n + X_2 \mod n + X_3 \mod n + X_4 \mod n = X_1 \mod n + (X_2 \mod n + X_3 \mod n + X_4 \mod n)$ $X_1 \mod n \cdot X_2 \mod n \cdot X_3 \mod n \cdot X_4 \mod n = X_1 \mod n \cdot (X_2 \mod n \cdot X_3 \mod n \cdot X_4 \mod n)$ $(0,0,1) + (0,0,1) + (0,0,1) = [(0,0,1) + (0,0,1)] + (0,0,1) = (0,0,1) + [(0,0,1) + (0,0,1)] = (0,0,3)$ (2) Distributive $3[(0,0,1)] = 1[(0,0,1)] + 2[(0,0,1)] = (0,0,3)$ (3) Commutative $3[(0,0,1)] \cdot 1[(0,0,1)] = 1[(0,0,1)] 3[(0,0,1)] = (0,0,3)$ Variations of the Prime Coordinate System [Relatively Prime Coordinate System]

Generally, any set of relatively prime numbers can be used to form an alternative coordinate system. Proof 1 as illustrated will be true for the system and the properties will generally be the same.

Example 6

For an alternate coordinate system {30,7,11}, the 3 numbers are relatively prime (1,0,0)=1771

(0,1,0)=330

(0,0,1)=210

(1,2,3)=[1771+660+630] mod 2310=751

Note: 30.7.11=2310 [There are 2310 different combinations of coordinates]

Example 7

For an alternate coordinate system {4,9,25}, the 3 numbers are relatively prime (1,0,0)=225

(0,1,0)=100

(0,0,1)=576

(1,2,3)=[225+200+1728] mod 900=353

Note: 4.9.25=900 [There are 900 different combinations of coordinates]

Key Generation, Encryption, Decryption

Key generation, encryption, and decryption are described herein, according to some embodiments of the invention.

Reference is made to FIG. 1 which is a simplified flow chart showing message exchanges among a key generation apparatus 20, an encryption apparatus 30, and a decryption apparatus 40.

In block 101, the key generation apparatus 20 receives a key generation request and generates a symmetric key.

In block 103, the key generation apparatus 20 sends the symmetric key and, optionally, at least one cryptography parameter to the encryption apparatus 30 by way of one or more transmissions. An example of cryptography parameter is cipher text dependent variable.

In block 105A, the encryption apparatus 30 receives the symmetric key and optionally, the at least one cryptography parameter.

In block 105B, the decryption apparatus 40 receives the symmetric key and optionally the at least one cryptography parameter, which may be received from the key generation apparatus 20 or the encryption apparatus 30.

In block 107, the encryption apparatus 30 receives a plain text message which includes at least one plain text. Using at least the symmetric key and, optionally, the at least one cryptography parameter, the encryption apparatus 30 encrypts the plain text message to provide or produce a cipher text message which includes at least one cipher text.

In block 109, the encryption apparatus 30 sends the cipher text message to a decryption apparatus 40 directly or indirectly.

In block 111, the decryption apparatus 40 receives the cipher text message generated by the encryption apparatus 30. Using the symmetric key and, optionally, the at least one cryptography parameter and possibly other parameters, the decryption apparatus 40 decrypts the cipher text message to provide or produce a plain text message which is necessarily equivalent to the plain text message in block 107.

In optional block 113, if a cryptography parameter is changed, the encryption apparatus 30 sends the changed or updated cryptography parameter to the key generation apparatus 20 and/or the decryption apparatus 40.

In optional block 115, the key generation apparatus 20 may receive the changed or updated cryptography parameter which may be used in subsequent key generation. The change or update may be ascertained from the cipher text produced in block 107.

In optional block 117, the decryption apparatus 40 may receive the updated cryptography parameter and may use the updated cryptography parameter in subsequent decryption.

It is to be appreciated that a sender apparatus may be communicably coupled to or include the encryption apparatus 30 and may provide the plain text message to the encryption apparatus 30. A receiver apparatus may be communicably coupled to or include the decryption apparatus 40 and may provide the symmetric key to the decryption apparatus 40. The key generation apparatus 20 may receive the key generation command from the encryption apparatus 30 or other apparatus.

Key Generation

Figure 2A:
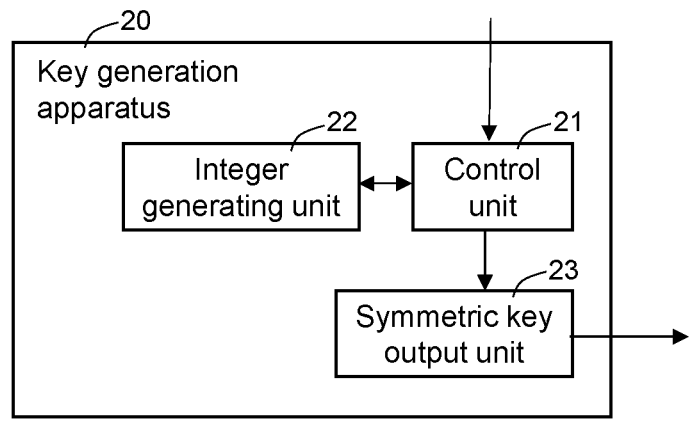
FIG. 2A is a schematic representation of a key generation apparatus.
Figure 2B:
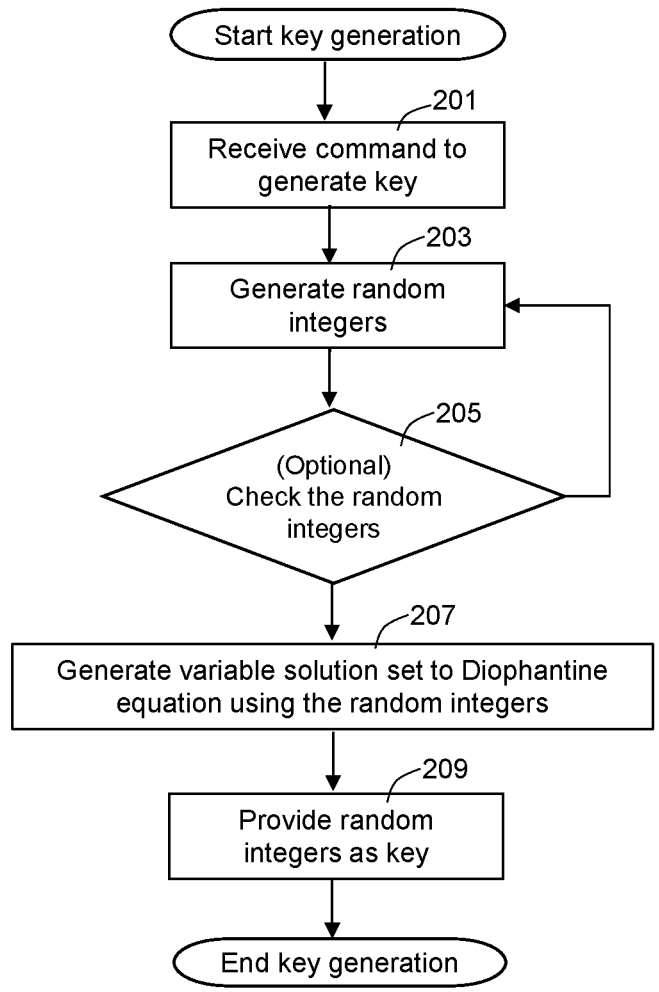
FIG. 2B is a simplified flow chart showing a key generation method.

Reference is made to FIGS. 2A and 2B, according to some embodiments of the invention.

FIG. 2A is a schematic representation of a key generation apparatus 20 which may comprise a control unit 21, an integer generating unit 22 communicably coupled thereto, and a symmetric key output unit 23 communicably coupled to the control unit 21. The control unit 21 may be configured to receive key generation command. The symmetric key output unit 23 may be configured to send or provide a symmetric key to another apparatus.

FIG. 2B is a flow chart showing a key generation method which may be performed by the key generation apparatus 20 or other suitable key generation apparatus.

In block 201, a key generation apparatus 20, e.g. control unit 21 or integer generating unit 22, receives a key generation command.

In block 203, in response to the key generation which may be provided by the control unit 21 to the integer generating unit 22, the key generation apparatus 20, e.g. integer generating unit 22, generates a plurality of integers, e.g. random integers, which may be generated according to a predetermined algorithm, and provides the integers to the control unit 21. Alternatively, the integers may be predefined. Block 203 may proceed to block 207 (i.e. bypass block 205) or to block 205.

In optional block 205, the key generation apparatus 20, e.g. control unit 21, may check the generated integers for compliance with a predetermined key parameter. For example, the generated integers may be ascertained whether they are within or exceed a value limit. If the predetermined key parameter is complied with, block 205 proceeds to block 207; otherwise, block 205 returns to block 203 if the predetermined key parameter is not complied with and replacement integers are generated and checked for compliance.

In block 207, using the generated integers from block 203, the key generation apparatus 20, e.g. control unit 21, generates at least one variable solution $(v_1, \ldots, v_n)$ set which is configured to solve Diophantine equation(s).

In block 209, the generated integers and variable solution set ($v_1, \ldots, v_n$) may be provided or output by the control unit 21 to the symmetric key output unit 23. The symmetric key output unit 23 may send or provide the symmetric key and/or the at least one variable solution set ($v_1, \ldots, v_n$) to the encryption apparatus 30, decryption apparatus 40 and/or other apparatus.

Encryption

Figure 3A:
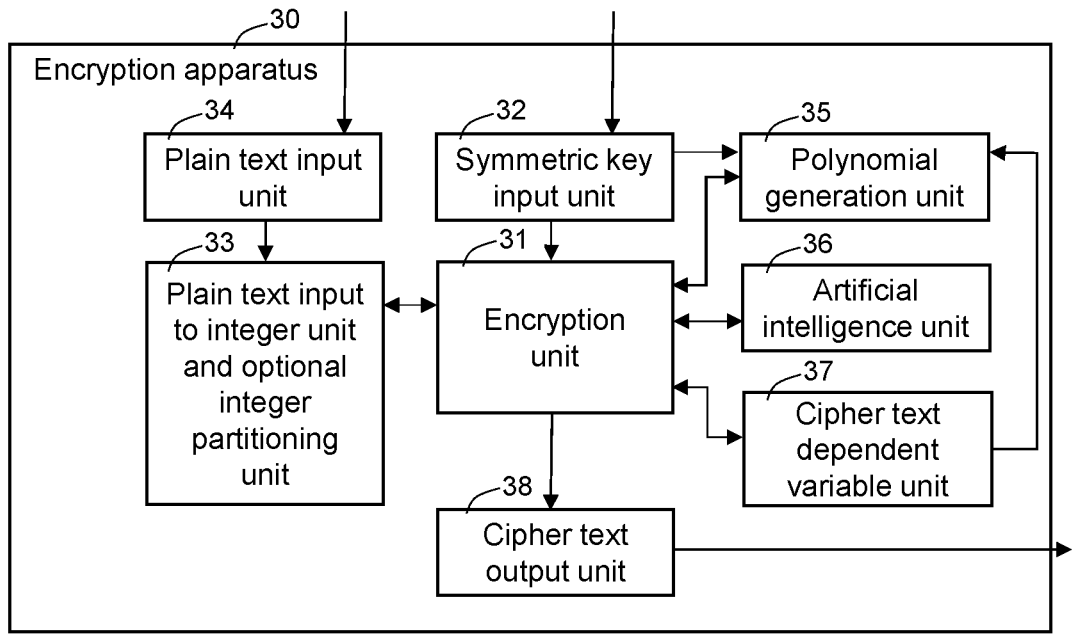
FIG. 3A is a schematic representation of an encryption apparatus.
Figure 3B:
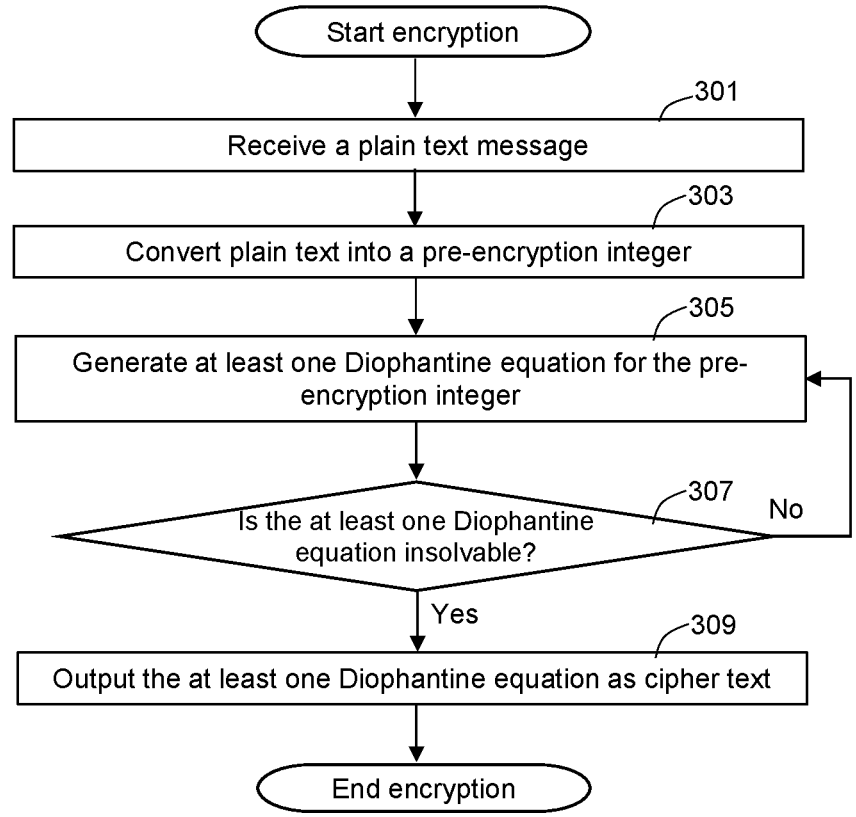
FIG. 3B is a simplified flow chart showing an encryption method.

Reference is made to FIGS. 3A and 3B, according to some embodiments of the invention.

FIG. 3A is a schematic representation of an encryption apparatus 30 which may comprise an encryption unit 31 which may be communicably coupled to symmetric key input unit 32 (which may be configured to receive at least one symmetric key from the encryption unit 31), plain text to integer unit 33 (which may be configured to receive at least one pre-encrypted integer ($M_1, \ldots, M_n$) from the plain text input unit 34), polynomial generation unit 35 (which may be configured to receive at least one symmetric key from the symmetric key input unit 32 or encryption unit 31 and provide at least one variable solution set ($v_1, \ldots, v_n$) to the encryption unit 31), artificial intelligence (AI) unit 36 (which may be configured to receive at least one Diophantine equation from encryption unit 31 and provide a prediction of insolvability or solvability of Diophantine equation(s) to the encryption unit 31), optional cipher text dependent variable unit 37 (which may be configured to receive at least one Diophantine equation from the encryption unit 31 and provide a cipher text variable to the encryption unit 31), and cipher text output unit 38 (which may be configured to receive cipher text being at least one Diophantine equation from the encryption unit 31 and send the cipher text to a decryption apparatus 40 directly or indirectly). The plain text to integer unit 33 may include an optional integer partitioning unit (which may be configured to receive prime integers from the symmetric key input unit 32 directly or indirectly through the encryption unit 31, and provide partitioned integers to the encryption unit 31) and may be communicably coupled to plain text input unit 34. The plain text input unit 34 may be configured to receive at least one plain text from another apparatus and provide the received plain text to the plain text to integer unit 33. The symmetric key input unit 32 may be configured to receive at least one symmetric key from another apparatus and provide the received symmetric key to the encryption unit 31 and optionally polynomial generation unit 35).

FIG. 3B is a flow chart showing an encryption method which may be performed by the encryption apparatus 30 or other suitable encryption apparatus.

In block 301, the encryption apparatus 30, e.g. symmetric key input unit 32, receives at least one symmetric key. The encryption apparatus 30, e.g. plain text input unit 34, receives a plain text message which includes at least one plain text, and sends the plain text message to the plain text to integer unit 33. It is to be appreciated that the receipt of the symmetric key and the plain text message may occur at different times or sequence.

In block 303, the encryption apparatus 30, e.g. plain text to integer unit 33, converts the at least one plain text to at least one pre-encryption integer ($M_1, \ldots, M_n$).

In block 305, using at least the at least one symmetric key and the at least one pre-encryption integer ($M_1, \ldots, M_n$), the encryption apparatus, e.g. encryption unit 31, generates at least one Diophantine equation which will be provided as a cipher text message which includes at least one cipher text. Block 305 may be implemented by one of possible method examples described below.

In an example (basic), using the at least one symmetric key, the encryption apparatus 30, e.g. polynomial generation unit 35, may generate at least one variable solution set ($v_1, \ldots, v_n$) for producing at least one Diophantine equation solvable therewith. Each variable may be derived from at least one integer of the at least one symmetric key. Using the generated variable solution set ($v_1, \ldots, v_n$) and the at least one pre-encryption integer ($M_1, \ldots, M_n$), the encryption apparatus 30, e.g. encryption unit 31, may generate at least one Diophantine equation which is solvable by the at least one variable solution set ($v_1, \ldots, v_n$).

In another example (involving faux Diophantine equation), using the at least one symmetric key, the encryption apparatus 30, e.g. polynomial generation unit 35, may generate at least one variable solution set ($v_1, \ldots, v_n$) for producing at least one Diophantine equation and at least one faux Diophantine equation. Each variable may be derived from at least one integer of the at least one symmetric key. Using the generated variable solution set ($v_1, \ldots, v_n$) and the at least one pre-encryption integer ($M_1, \ldots, M_n$), the encryption apparatus, e.g. encryption unit 31, may generate at least one Diophantine equation which is solvable by the at least one variable solution set and at least one faux Diophantine equation. A solution for each faux Diophantine equation is ascertained, e.g. by the encryption unit 31 or a faux equation evaluation or other unit (not shown) communicably coupled thereto, for compliance with a predetermined faux Diophantine equation condition. If the solution is ascertained as a non-integer, the faux Diophantine equation will be provided as faux cipher text. If the solution is ascertained as an integer, the faux Diophantine equation will not be provided as cipher text; instead, a replacement faux Diophantine equation will be generated, e.g. by the encryption unit 31, and its solution ascertained for compliance in a similar manner.

In yet another example (involving cipher text dependent variable), using the at least one symmetric key and a cipher text dependent variable, e.g. provided by the cipher text dependent variable unit 37, the encryption apparatus 30, e.g. polynomial generation unit 35, may generate at least one variable solution set ($v_1, \ldots, v_n$) for producing at least one Diophantine equation solvable therewith. Each variable may be derived from at least one integer of the at least one symmetric key and the cipher text dependent variable. Using the generated variable solution set ($v_1, \ldots, v_n$), the encryption apparatus 30, e.g. encryption unit 31, may generate at least one Diophantine equation which is solvable by the at least one variable solution set ($v_1, \ldots, v_n$). The cipher text dependent variable may be initially set at a predetermined value, e.g. random value, and subsequently changed or updated depending on the cipher text generated. For example, the cipher text dependent variable may be based on a coefficient of a variable ($v_1, \ldots,$ or $v_n$) in a Diophantine equation of a previous cipher text, wherein the variable ($v_1, \ldots,$ or $v_n$) in the Diophantine equation of the previous cipher text includes a polynomial degree based on a previous cipher text dependent variable.

In a further example (involving concealment variable), using the at least one symmetric key, the encryption apparatus 30, e.g. polynomial generation apparatus 35, may generate at least one variable solution set ($v_1, \ldots, v_n$) for producing at least one Diophantine equation solvable therewith. Each variable may be derived from at least one integer of the at least one symmetric key. Using at least some variables of the generated variable solution set ($v_1, \ldots, v_n$) (or a first subset thereof) and the at least one pre-encryption integer ($M_1, \ldots, M_n$), the encryption apparatus 30, e.g.

encryption unit 31, may generate at least one initial Diophantine equation. Using at least one concealment variable derived from at least one variable of the variable solution set $(v_1, \ldots, v_n)$ (or a second subset thereof), the encryption apparatus 30, e.g. encryption unit 31, may modify the at least one initial Diophantine equation to generate the at least one Diophantine equation which is solvable by the at least one variable solution set $(v_1, \ldots, v_n)$. Such modification may include performing addition, subtraction, multiplication, and/or division on the at least one initial Diophantine equation with the concealment variable or its derivation. The first subset and the second subset may include mutually exclusive variables or may include common variable(s).

In a yet further example (involving integer partitioning), using the at least one symmetric key, the encryption apparatus 30, e.g. polynomial generation unit 35, may generate at least one variable solution set $(v_1, \ldots, v_n)$ for producing at least one Diophantine equation $(v_1, \ldots, v_n)$ solvable therewith. Each variable may be derived from at least one integer of the at least one symmetric key and the cipher text dependent variable. Based on a plurality of relatively prime integers, e.g. provided by the symmetric key input unit 32, the encryption apparatus, e.g. the optional integer partitioning unit, partitions the pre-encryption integer $(M_1, \ldots, M_n)$ into a plurality of partitioned integers. The number or count of Diophantine equations may be equivalent to a count of the relatively prime integers as well as a count of the partitioned integers. Partitioning the at least one pre-encryption integer $(M_1, \ldots, M_n)$ may include performing a plurality of modulo operations using the at least one pre-encryption integer $(M_1, \ldots, M_n)$, and the relatively prime integers being a plurality of divisors, and deriving therefrom the partitioned integers being a plurality of remainders.

In a yet another further example (involving cipher text dependent variable, concealment variable, and integer partitioning), using the at least one symmetric key and a cipher text dependent variable, the encryption apparatus 30, e.g. polynomial generation unit 35, may generate at least one variable solution set $(v_1, \ldots, v_n)$ for producing at least one Diophantine equation $(v_1, \ldots, v_n)$ solvable therewith. Each variable may be derived from at least one integer of the at least one symmetric key and the cipher text dependent variable. Based on a plurality of relatively prime integers, e.g. provided by the symmetric key input unit 32, the encryption apparatus, e.g. the optional integer partitioning unit, partitions the at least one pre-encryption integer $(M_1, \ldots, M_n)$ into a plurality of partitioned integers. Using at least some variables of the variable solution set $(v_1, \ldots, v_n)$ (or a first subset thereof) and the partitioned integers, the encryption apparatus 30, e.g. encryption unit 31, may generate a plurality of initial Diophantine equations. Using a concealment variable derived from at least one variable of the variable solution set $(v_1, \ldots, v_n)$ (or a second subset thereof), the encryption apparatus, e.g. encryption unit 31, may modify the initial Diophantine equations to generate a plurality of Diophantine equations which are solvable by the at least one variable solution set $(v_1, \ldots, v_n)$. The number or count of Diophantine equations may be equivalent to a count of the relatively prime integers as well as a count of the partitioned integers. The cipher text dependent variable and the concealment variable may be ascertained in a similar manner as described in the preceding examples. Partitioning the at least one pre-encryption integer $(M_1, \ldots, M_n)$ may include performing a plurality of modulo operations using the at least one pre-encryption integer $(M_1, \ldots, M_n)$, and the relatively prime integers being a plurality of divisors, and deriving therefrom the partitioned integers being a plurality of remainders.

In block 307, the encryption apparatus 30, e.g. AI unit 36, predicts, using a trained AI model which may comprise a prediction algorithm, insolvability or solvability of the at least one Diophantine equation produced in block 305, including any faux Diophantine equation(s). If the at least one Diophantine equation, including any faux Diophantine equation, is predicted as insolable, the at least one Diophantine equation will be provided or output as cipher text. On the other hand, if any Diophantine equation, including any faux Diophantine equation, is predicted as solvable, the flow chart returns to block 305 where at least one replacement Diophantine equation is produced and its insolvability or solvability is predicted in block 307. If the at least one replacement Diophantine equation is predicted as insolable, this replacement Diophantine equation(s) as well as a subset of the at least one Diophantine equation which is predicted as insolable will be provided or output as cipher text.

In block 309, based on the AI prediction of insolvability or solvability of the at least one Diophantine equation in block 307, the encryption apparatus 30, e.g. cipher text output unit 38, provides or outputs at least one insolable Diophantine equation, including any replacement or faux Diophantine equation(s) which insolvability is predicted, as a cipher text message which includes at least one cipher text. The cipher text may be sent to a decryption apparatus 40 or other apparatus.

In the example (involving at least one faux Diophantine equation), the at least one faux Diophantine equation, which complies with the predetermined faux Diophantine equation condition, is provided or output as a faux cipher text message which includes at least one faux cipher text. The faux cipher text message and the cipher text message may be sent or provide, e.g. by cipher text output unit 38, to a decryption apparatus 40 or other apparatus at a predetermined or random interval.

Artificial Intelligence

Figure 3C:
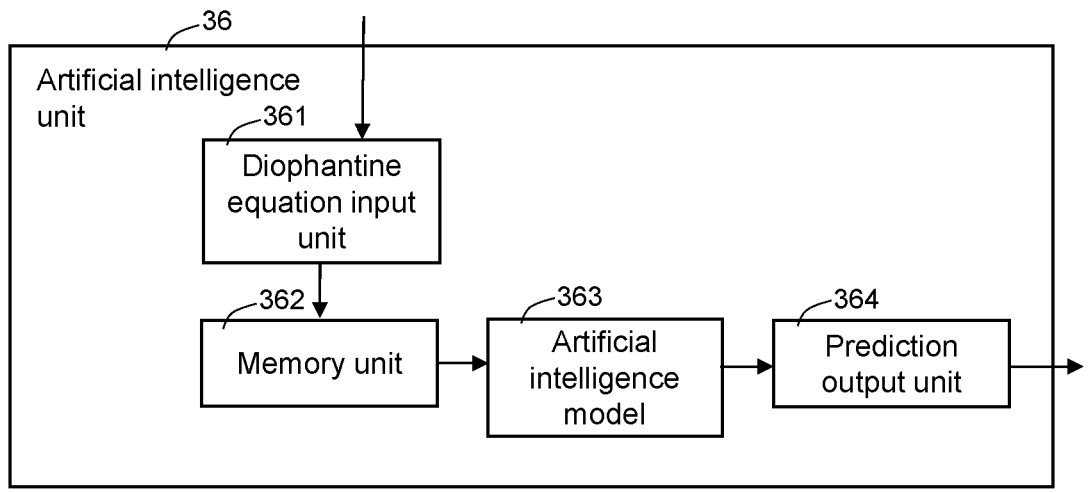
FIG. 3C is a schematic representation of an artificial intelligence (AI) unit.
Figure 3D:
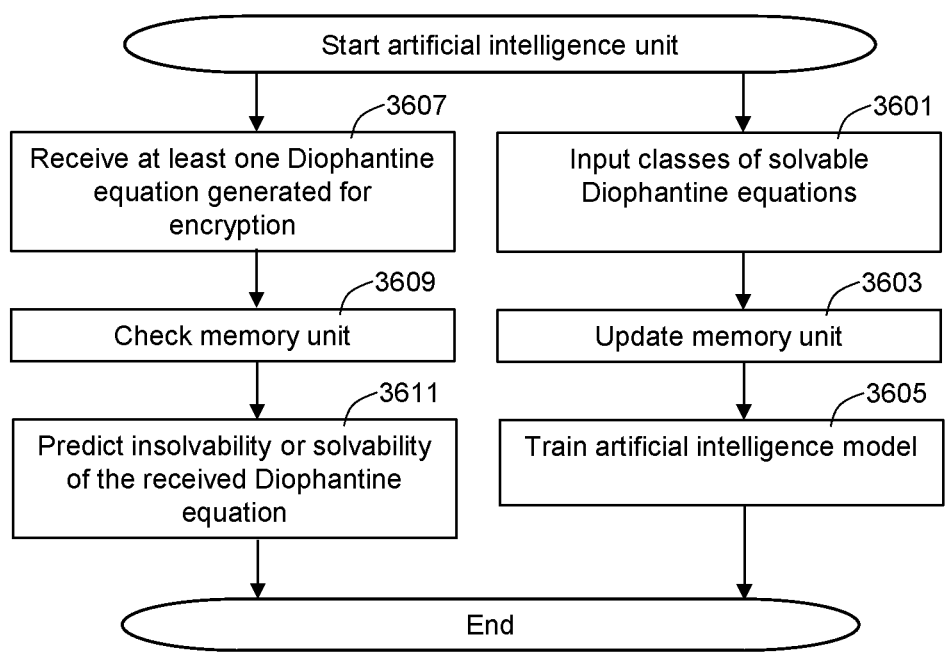
FIG. 3D is a simplified flow chart showing an AI training and/or prediction method.

Reference is made to FIGS. 3C and 3D, according to some embodiments of the invention.

FIG. 3C is a schematic representation of an artificial intelligence (AI) unit 36 which may be employed by the encryption apparatus 30. The AI unit 36 may comprise a Diophantine equation input unit 361, a memory unit 362 communicably coupled thereto, a trained AI model 363 communicably coupled thereto, a prediction output unit 364 communicably coupled thereto. The trained AI model 363 may comprise a prediction algorithm or equivalent which is configured to predict insolvability or solvability of a Diophantine equation.

FIG. 3D includes a flow chart of an AI training method which may be performed by the AI unit 36 or other suitable AI apparatus.

In block 3601, the AI unit 36, e.g. Diophantine equation input unit 361, receives classes or examples of Diophantine equations which are solvable.

In block 3603, the AI unit 36, e.g. memory unit 362, stores the received classes or examples of solvable Diophantine equations.

In block 3605, the AI unit 36, e.g. AI model 363 which may comprise a prediction algorithm, is trained using the solvable Diophantine equations provided by the memory unit 362.

FIG. 3D includes a flow chart of an AI prediction method which may be performed by the AI unit 36 or other suitable AI apparatus.

In block 3607, the AI unit 36, e.g. Diophantine equation input unit 361, receives at least one Diophantine equation which is generated in block 305 to be used as cipher text.

In block 3609, using the classes or examples of solvable Diophantine equations which may be stored in the memory unit 362 or other memory unit, the AI unit 36, e.g. trained AI model 363, predicts whether the received Diophantine equation to be used as cipher text is insolvable or solvable.

In block 3611, using the prediction from block 3609, the AI unit 36, e.g. prediction output unit 364, provides or outputs the prediction, e.g. insolvability or solvability of the received Diophantine equation to be used as cipher text. The prediction may be sent to the encryption unit 31 to be considered in the above-described block 307.

Decryption

Figure 4A:
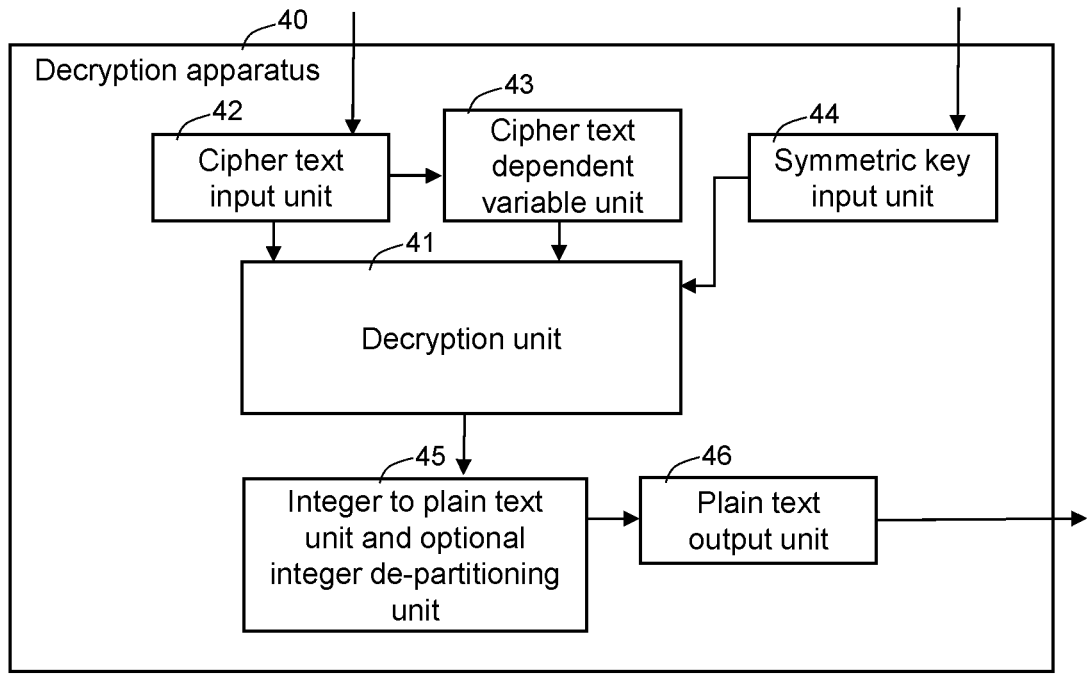
FIG. 4A is a schematic representation of a decryption apparatus.
Figure 4B:
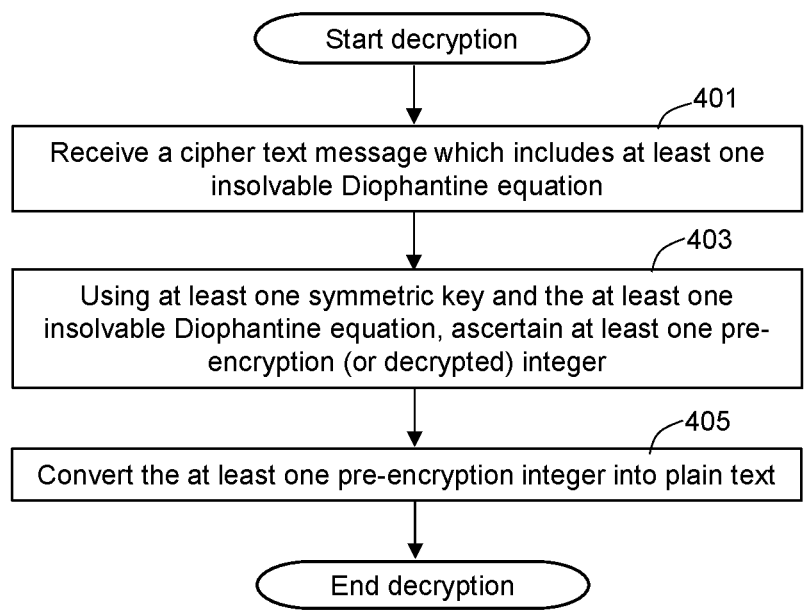
FIG. 4B is a simplified flow chart showing a decryption method.

Reference is made to FIGS. 4A and 4B, according to some embodiments of the invention.

FIG. 4A is a schematic representation of a decryption apparatus 40 which may comprise a decryption unit 41 which is communicably coupled to a cipher text input unit 42 (which may be configured to receive cipher text from another apparatus and provide the cipher text to the decryption unit 41), an optional cipher text dependent variable unit 43 (which may be configured to provide cipher text dependent variable to the decryption unit 41), a symmetric key input unit 44 (which may be configured to receive symmetric key from another apparatus and provide the symmetric key to the decryption unit 41), and an integer to plain text unit 45 (which may be configured to receive integer from the decryption unit 41 and provide plain text to a plain text output unit 46). The integer to plain text unit 45 may be communicably coupled to the plain text output unit 46 and may include an optional integer de-partitioning unit which may be configured to de-partition integers and provide the de-partitioned integer(s) to the plain text output unit 46. The optional cipher text dependent variable unit 43 may be communicably coupled to the cipher text unput unit 42. The optional cipher text dependent variable unit 43 may receive an initial value of cipher text dependent variable from a key generation apparatus 20 and thereafter receive a subsequent or updated value of cipher text dependent variable from the cipher text input unit 42 or ascertain the subsequent or updated value of cipher text dependent variable based on cipher text received from cipher text input unit 42.

FIG. 4B is a flow chart showing a decryption method which may be performed by the decryption apparatus 40 or other suitable decryption apparatus.

In block 401, the decryption apparatus 40, e.g. symmetric key input unit 44, receives a symmetric key. The decryption apparatus 40, e.g. cipher text input unit 42, receives a cipher text message which includes at least one cipher text. It is to be appreciated that the receipt of the symmetric key and the cipher message may occur at different times or sequence. The cipher text may include at least one Diophantine equation which is insolvable and may include at least one faux Diophantine equation which will be identified in block 403.

In block 403, using at least the at least one symmetric key and the at least one cipher text, the decryption apparatus 40, e.g. decryption unit 41, solves the at least one Diophantine equation to ascertain or obtain at least one pre-encrypted or decrypted integer ($M_1, \ldots, M_n$). Block 403 may be implemented by one of possible method examples described below.

In an example, using the at least one symmetric key, the decryption apparatus 40, e.g. decryption unit 41, may generate at least one variable solution set ($v_1, \ldots, v_n$) for solving or decrypting the at least one Diophantine equation. Each variable may be derived from at least one integer of the at least one symmetric key. Using the generated variable solution set ($v_1, \ldots, v_n$), the decryption apparatus 40, e.g. decryption unit 41, solves the at least one Diophantine equation to ascertain at least one pre-encrypted or decrypted integer ($M_1, \ldots, M_n$), and thereafter provides the pre-encrypted integer ($M_1, \ldots, M_n$) to the integer to plain text unit 45.

In another example (involving faux Diophantine equation), using the at least one symmetric key, the decryption apparatus 40, e.g. decryption unit 41, may generate at least one variable solution set ($v_1, \ldots, v_n$) for solving or decrypting the at least one Diophantine equation. Each variable may be derived from at least one integer of the at least one symmetric key. Using the generated variable solution set ($v_1, \ldots, v_n$), the decryption apparatus 40, e.g. decryption unit 41, solves the at least one Diophantine equation i.e. a plurality of Diophantine equations, and to ascertain at least one pre-encrypted or decrypted integer ($M_1, \ldots, M_n$), and thereafter provides the at least one pre-encrypted integer ($M_1, \ldots, M_n$) to the integer to plain text unit 45. If solving any of the at least one Diophantine equation produces a non-integer solution, the particular Diophantine equation is ascertained as a faux Diophantine equation and hence its non-integer solution will not be provided to the integer to plain text unit 45. Only integer solution(s) ($M_1, \ldots, M_n$) will be provided to the integer to plain text unit 45.

In yet another example (involving cipher text dependent variable), using the at least one symmetric key and a cipher text dependent variable, e.g. provided by the cipher text dependent variable input unit 43, the decryption apparatus 40, e.g. decryption unit 41, may generate at least one variable solution set ($v_1, \ldots, v_n$) for solving or decrypting the at least one Diophantine equation. Each variable may be derived from at least one integer of the at least one symmetric key and the cipher text dependent variable. Using the generated variable solution set ($v_1, \ldots, v_n$), the decryption apparatus 40, e.g. decryption unit 41, solves the at least one Diophantine equation to ascertain at least one pre-encrypted or decrypted integer, and thereafter provides the pre-encrypted integer to the integer to plain text unit 45.

In a further example (involving concealment variable), using the at least one symmetric key, the decryption apparatus 40, e.g. decryption unit 41, may generate at least one variable solution set ($v_1, \ldots, v_n$) for solving or decrypting the at least one Diophantine equation. Each variable may be derived from at least one integer of the at least one symmetric key. Using at least some variables of the generated variable solution set ($v_1, \ldots, v_n$) (or a first subset thereof) and a concealment variable (or a second subset of the generated variable solution set ($v_1, \ldots, v_n$)), the decryption apparatus 40, e.g. decryption unit 41, solves the at least one Diophantine equation, including modifying the at least one Diophantine equation or its derivative by the concealment variable, to ascertain a pre-encrypted or decrypted integer ($M_1, \ldots, M_n$) which is then provided to the integer to plain text unit 45. The concealment variable may be derived from at least one variable of the generated variable solution set ($v_1, \ldots, v_n$) (or a second subset thereof). Such modification may include performing addition, subtraction, multiplication, and/or division, using the concealment variable, on the at least one Diophantine equation or its derivative in a manner to compensate for or negate the modification performed during encryption using the concealment variable. The first subset and the second subset may include mutually exclusive variables or may include common variable(s).

In another further example (involving integer partitioning), using the at least one symmetric key, the decryption apparatus 40, e.g. decryption unit 41, may generate at least one variable solution set ($v_1, \ldots, v_n$) for solving or decrypting the at least one Diophantine equation. Each variable may be derived from at least one integer of the at least one symmetric key. Using at least some variables of the generated variable solution set ($v_1, \ldots, v_n$) (or a first subset thereof), the decryption apparatus 40, e.g. decryption unit 41, solves the at least one Diophantine equation, i.e. plurality of Diophantine equations to ascertain a plurality of partitioned integers (or partitioned pre-encryption or decrypted integers). The partitioned integers may then be provided to the integer de-partitioning unit. The first subset and the second subset may include mutually exclusive variables or may include common variable(s).

In a yet another further example (involving cipher text dependent variable, concealment variable, and integer partitioning), using the at least one symmetric key and a cipher text dependent variable, the decryption apparatus 40, e.g. decryption unit 41, may generate at least one variable solution set ($v_1, \ldots, v_n$) for solving or decrypting the at least one Diophantine equation. Each variable may be derived from at least one integer of the at least one symmetric key and the cipher text dependent variable. Using at least some variables of the generated variable solution set ($v_1, \ldots, v_n$) (or a first subset thereof) and a concealment variable (or a second subset of the generated variable solution set ($v_1, \ldots, v_n$), the decryption apparatus 40, e.g. decryption unit 41, solves the at least one Diophantine equation, i.e. plurality of Diophantine equations to ascertain a plurality of partitioned integers (or partitioned pre-encryption or decrypted integers). The solving may include substituting the at least one variable solution set ($v_1, \ldots, v_n$) into the Diophantine equations and modifying the Diophantine equations with the concealment variable, e.g. cipher text dependent variable, in this or different sequence. Modifying the at least one Diophantine equation may include performing addition, subtraction, multiplication, and/or division, using the concealment variable, on the Diophantine equations or their derivative in a manner to compensate for or negate the modification performed during encryption using the same concealment variable. The partitioned integers may then be provided to the integer de-partitioning unit. The first subset and the second subset may include mutually exclusive variables or may include common variable(s).

In block 405, the decryption apparatus 40, e.g. integer to plain text unit 45, converts the at least one pre-encrypted or decrypted integer into at least one plain text, and provides or outputs the at least one plain text to the plain text output unit 46.

In any preceding example (which includes integer partitioning) where partitioned integers are provided to the integer to plain text unit 45 to be converted to plain text, the decryption apparatus 40, e.g. integer de-partitioning unit, may de-partition the partitioned integers to ascertain or obtain at least one pre-encrypted integer ($M_1, \ldots, M_n$). In particular, using a plurality of relatively prime integers and the partitioned integers, the pre-encryption integer ($M_1, \ldots, M_n$) is ascertained or obtained. The relatively prime integers may be obtained from the at least one cipher text through substituting the at least one variable solution set ($v_1, \ldots, v_n$) into the Diophantine equations during de-partitioning. The de-partitioning may include performing a plurality of Euclidean algorithm operations using the partitioned integers as a plurality of remainders and the relatively prime integers as a plurality of quotients, and deriving therefrom at least one pre-encryption integer ($M_1, \ldots, M_n$). A count of the relatively prime integers, a count of the partitioned integers, and a count of the Diophantine equations to be decrypted are equivalent.

After block 405, the decryption apparatus 40, e.g. plain text output unit, may send or provide a plain text message which includes the at least one plain text to another apparatus.

Examples of key generation, encryption and decryption are illustrated below.

Example (Basic)

Key Generation:
Receive Command to Generate Key
Create 20 random integers denoted by
($y_1, y_2, y_3, y_4, y_5, y_6, y_7, y_8, y_9, y_{10}, z_1, z_2, z_3, z_4, z_5, z_6, z_7, z_8, z_9, z_{10}$)

Let $v_n = y_n * z_n$

Generate Random Integers
In this example:
$y_1=1, y_2=2, y_3=3, y_4=4, y_5=5, y_6=6, y_7=7, y_8=8, y_9=9, y_{10}=10$
$z_1=1, z_2=2, z_3=3, z_4=4, z_5=5, z_6=6, z_7=7, z_8=8, z_9=9, z_{10}=10$ $$v_1=1*1=1$$

$$v_2=2*2=4$$

$$v_3=3*3=9$$

$$v_4=4*4=16$$

$$v_5=5*5=25$$

$$v_6=6*6=36$$

$$v_7=7*7=49$$

$$v_8=8*8=64$$

$$v_9=9*9=81$$

$$v_{10}=10*10=100$$

End Key Generation
Start Encryption:
Acquire Plaintext Message
Let the plain text message be "hi!"
Convert Plaintext to Integer
Using the ASC II code "hi!" is represented by 104, 105, 33. "9" may be added in front of 2-digit characters to allow for easier encryption and decryption.

Hence, the integer to be encrypted will be "104105933".
Generate Diophantine Equation Based on Symmetric Key.

From above, the value of $v_1, v_2, v_3, v_4, v_5, v_6, v_7, v_8, v_9, v_{10}$ are ascertained.

$v_2, v_3, v_4, v_5, v_6, v_7, v_8, v_9, v_{10}$ will be used as variables in the Diophantine equation.

Diophantine equation generated:

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$$

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $$X^2=5v_1^{10005032}+2(v_2^2)(v_1^{89})+v_3^2+v_4^2+v_5^2+v_6^2+v_7^2+v_8^2+v_9^2+v_{10}^3+10838045284785136$$

End of Encryption
Start Decryption:
Acquire Cipher Text $$X^2=5v_1^{10005032}+2(v_2^2)(v_1^{89})+v_3^2+v_4^2+v_5^2+v_6^2+v_7^2+v_8^2+v_9^2+v_{10}^3+10838045284785136$$

Solve Diophantine Equations Using Symmetric Key.
Given the following values,
$y_1=1$, $y_2=2$, $y_3=3$, $y_4=4$, $y_5=5$, $y_6=6$, $y_7=7$, $y_8=8$, $y_9=9$, $y_{10}=10$
$z_1=1$, $z_2=2$, $z_3=3$, $z_4=4$, $z_5=5$, $z_6=6$, $z_7=7$, $z_8=8$, $z_9=9$, $z_{10}=10$ Let $v_n=y_n*z_n$ $v_2=2*2=4$ $v_3=3*3=9$ $v_4=4*4=16$ $v_5=5*5=25$ $v_6=6*6=36$ $v_7=7*7=49$ $v_8=8*8=64$ $v_9=9*9=81$ $v_{10}=10*10=100$ Using the symmetric key, value of X is ascertained as $X=104105933$.

Generate Message Integer
From the above, $X=104105933$
Convert Integer to Message
Based on the ASC II code for integers 104, 105, 33, the message "hi!" is ascertained.
End of Decryption Example (Involving Faux Diophantine Equation)

Key Generation:
Receive Command to Generate Key
Create 20 random integers denoted by
($y_1$, $y_2$, $y_3$, $y_4$, $y_5$, $y_6$, $y_7$, $y_8$, $y_9$, $y_{10}$, $z_1$, $z_2$, $z_3$, $z_4$, $z_6$, $z_6$, $z_7$, $z_8$, $z_9$, $z_{10}$)

Let $v_n=y_n*z_n$

Generate Random Integers
In this example,
$y_1=1$, $y_2=2$, $y_3=3$, $y_4=4$, $y_5=5$, $y_6=6$, $y_7=7$, $y_8=8$, $y_9=9$, $y_{10}=10$
$z_1=1$, $z_2=2$, $z_3=3$, $z_4=4$, $z_5=5$, $z_6=6$, $z_7=7$, $z_8=8$, $z_9=9$, $z_{10}=10$ $v_1=1*1=1$ $v_2=2*2=4$ $v_3=3*3=9$ $v_4=4*4=16$ $v_5=5*5=25$ $v_6=6*6=36$ $v_7=7*7=49$ $v_8=8*8=64$ $v_9=9*9=81$ $v_{10}=10*10=100$ End Key Generation
Start Encryption:
Acquire Plaintext Message
Let the plain text message be "hp"
Convert Plaintext to Integer
Using the ASC II code "hi!" is represented by 104, 105733.9" may be added in front of 2-digit characters to allow for easier encryption and decryption.

Hence, the integer to be encrypted will be "104105933".
Generate Diophantine Equation Based on Symmetric Key
From the above, the value of $v_1$, $v_2$, $v_3$, $v_4$, $v_5$, $v_6$, $v_7$, $v_8$, $v_9$, $v_{10}$ are ascertained. $v_1$, $v_2$, $v_3$, $v_4$, $v_5$, $v_6$, $v_7$, $v_8$, $v_9$, $v_{10}$ will be used as variables in the Diophantine equation.
Diophantine Equation Generated:

$$X^2=5v_1^{10005032}+2(v_2^2)(v_1^{89})+v_3^2+v_4^2+v_5^2+v_6^2+v_7^2+v_8^2+v_9^2+v_{10}^3+10838045284785136$$

Generate Faux Diophantine Equation $$X^2=12v_1^{10002}+2(v_2^2)(v_1^{8129})+v_3^2+v_4^2+v_5^2+v_6^2+v_7^2+v_8^2+v_9^2+v_{10}^3+103090640$$

Solution Check [when using the symmetric key]

$X=10203\cdot23478$

X is not an integer when $v_1=1*1=1$ $v_2=2*2=4$ $v_3=3*3=9$ $v_4=4*4=16$ $v_5=5*5=25$ $v_6=6*6=36$ $v_7=*7=49$ $v_8=8*8=64$ $v_9=9*9=81$ $v_{10}=10*10=100$ Since X is non-integer, the faux Diophantine equation can be used. If X is an integer, a replacement faux Diophantine equation is generated and its solution checked.

Artificial Intelligence
Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$$

$$X^2 = 12v_1^{10002} + 2(v_2^2)(v_1^{8129}) + v_3^2 + v_4^2 + v_5^2 + v_6^2 + v_7^2 + v_8^2 + v_9^2 + v_{10}^3 + 1030960640$$

End of Encryption
Start Decryption:
Acquire Cipher Text $$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785136$$

$$X^2 = 12v_1^{10002} + 2(v_2^2)(v_1^{8129}) + v_3^2 + v_4^2 + v_5^2 + v_6^2 + v_7^2 + v_8^2 + v_9^2 + v_{10}^3 + 1030960640$$

Solve Diophantine Equations Using Symmetric Key
Given the following values,
$y_1=1$, $y_2=2$, $y_3=3$, $y_4=4$, $y_5=5$, $y_6=6$, $y_7=7$, $y_8=8$, $y_9=9$, $y_{10}=10$
$z_1=1$, $z_2=2$, $z_3=3$, $z_4=4$, $z_5=5$, $z_6=6$, $z_7=7$, $z_8=8$, $z_9=9$, $z_{10}=10$ Let $v_n = y_n * Z_n$ $v_1 = 1*1 = 1$ $v_2 = 2*2 = 4$ $v_3 = 3*3 = 9$ $v_4 = 4*4 = 16$ $v_5 = 5*5 = 25$ $v_6 = 6*6 = 36$ $v_7 = *7 = 49$ $v_8 = 8*8 = 64$ $v_9 = 9*9 = 81$ $v_{10} = 10*10 = 100$ Using the symmetric key: the value of X is ascertained as X=104105933 or X=10203·23478

Since X=10203·23478, it is known that this is the faux Diophantine equation or faux cipher text, while X=104105933 provides the real or genuine Diophantine equation or cipher text.

Generate Message Integer
From the above, X=104105933
Convert Integer to Message
Based on the ASC II code for integers 104, 105, 33, the message "hi!" is ascertained
End of Decryption

Example (Involving Cipher Text Dependent Variable)

Key Generation:
Receive Command to Generate Key
Create 20 random integers denoted by
$(y_1, y_2, y_3, y_4, y_5, y_6, y_7, y_8, y_9, y_{10}, z_1, z_2, z_3, z_4, z_6, z_6, z_7, z_8, z_9, z_{10})$ Create a cipher dependent variable; $K_n$ Let $v_n = y_n * z_n * K_n$ Generate Random Integers
In this example,
$y_1=1$, $y_2=2$, $y_3=3$, $y_4=4$, $y_5=5$, $y_6=6$, $y_7=7$, $y_8=8$, $y_9=9$, $y_{10}=10$
$z_1=1$, $z_2=2$, $z_3=3$, $z_4=4$, $z_5=5$, $z_6=6$, $z_7=7$, $z_8=8$, $z_9=9$, $z_{10}=10$ $K_n = 10$ $v_1 = 1*1*10 = 10$ $v_2 = 2*2*10 = 40$ $v_3 = 3*3*10 = 90$ $v_4 = 4*4*10 = 160$ $v_5 = 5*5*10 = 250$ $v_6 = 6*6*10 = 360$ $v_7 = 7*7*10 = 490$ $v_8 = 8*8*10 = 640$ $v_9 = 9*9*10 = 810$ $v_{10} = 10*10*10 = 1000$ End Key Generation
Start Encryption:
Acquire Plaintext Message
Let the plain text message be "hp"
Convert Plaintext to Integer
Using the ASC II code "hi!" is represented by 104, 105, 33. "9" may be added in front of 2-digit characters to allow for easier encryption and decryption.
Hence, the integer to be encrypted will be "104105933".
Generate Diophantine Equation Based on Symmetric Key
From the above, the value of $v_1$, $v_2$, $v_3$, $v_4$, $v_5$, $v_6$, $v_7$, $v_8$, $v_9$, $v_{10}$ are ascertained. $v_1$, $v_2$, $v_3$, $v_4$, $v_5$, $v_6$, $v_7$, $v_8$, $v_9$, $v_{10}$ will be used as variables in the Diophantine equation,
Diophantine equations generated:

$$X^2 = 5v_1^{10} + v_2^2 + v_3^2 + v_4^2 + v_5^2 + v_6^2 + v_7^2 + v_8^2 + v_9^2 + v_{10}^3 + 10837994284269289$$

Note that the value of $K_n$ will be changed from 10 to 5 when generating cipher text in subsequent encryption as the Diophantine equation has a term $5v_1^{10}$ with power to 10 and coefficient 5

The values of $v_1 \ldots v_{10}$ will change respectively to the following values in subsequent encryption:

$v_1 = 1*1*5 = 5$ $v_2 = 2*2*5 = 20$ $v_3 = 3*3*5 = 45$ $v_4 = 4*4*5 = 80$ $v_5 = 5*5*5 = 125$ $v_6 = 8*6*5 = 180$ $v_7 = 7*7*5 = 245$ $v_8=8*8*5=320$ $v_9=9*9*5=105$ $v_{10}=10*10*5=500$

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $$X^2=5v_1^{10}+v_2^2+v_3^2+v_4^2+v_5^2+v_6^2+v_7^2+v_8^2+v_9^2+v_{10}^3+10837994284269289$$

End of Encryption

Start Decryption:

Acquire Cipher Text $$X^2=5v_1^{10}+v_2^2+v_3^2+v_4^2+v_5^2+v_6^2+v_7^2+v_8^2+v_9^2+v_{10}^3+10837994284269289$$

Solve Diophantine Equations Using Symmetric Key

Given the following values;

$y_1=1$, $y_2=2$, $y_3=3$, $y_4=4$, $y_5=5$, $y_6=6$, $y_7=7$, $y_8=8$, $y_9=9$, $y_{10}=10$ $z_1=1$, $z_2=2$, $z_3=3$, $z_4=4$, $z_5=5$, $z_6=6$, $z_7=7$, $z_8=8$, $z_{10}=10$ $K_n=10$

Let $y_n=y_n*z_n*K_n$ $v_1=1*1*10=10$ $v_2=2*2*10=40$ $v_3=3*3*10=90$ $v_4=4*4*10=160$ $v_6=5*5*10=250$ $v_6=6*6*10=360$ $v_7=7*7*10=490$ $v_8=8*8*10=640$ $v_9=9*9*10=810$ $v_{10}=10*10*10=1000$

Using the symmetric key and cipher dependent generated variables, the following is obtained:

X=104105933

The value of $K_n$ will be changed from 10 to 5 when decrypting cipher text in subsequent decryption as there is a term $5v_1^{10}$ with power 10 and coefficient 5.

The values of will change respectively to the following values in subsequent decryption:

$v_1=1*1*5=5$ $v_2=2*2*5=20$ $v_3=3*3*5=45$ $v_4=4*4*5=80$ $v_6=5*5*5=125$ $v_6=6*6*5=180$ $v_7=7*7*5=245$ $v_8=8*8*5=320$ $v_9=9*9*5=105$ $v_{10}=10*10*5=500$

Generate Message Integer

From the above, X=104105933

Convert Integer to Message

Based on the ASC II code 104, 105, 33, the message "hi!" is ascertained.

End of Decryption

Example (Involving Concealment Variable)

Key Generation:

Receive Command to Generate Key

Create 22 random integers denoted by $(y_1, y_2, y_3, y_4, y_5, y_6, y_7, y_8, y_9, y_{10}, y_{11}, z_1, z_2, z_3, z_4, z_5, z_6, z_7, z_8, z_9, z_{10}, z_{11})$ Let $v_n=y_n*z_n$ Generate Random Integers In this example, $y_1=1$, $y_2=2$, $y_3=3$, $y_4=4$, $y_5=5$, $y_6=6$, $y_7=7$, $y_8=8$, $y_9=9$, $y_{10}=10$, $y_{11}=11$ $z_1=1$, $z_2=2$, $z_3=3$, $z_4=4$, $z_5=5$, $z_6=6$, $z_7=7$, $z_8=8$, $z_{10}=10$, $z_{11}=11$ $v_1=1*1=1$ $v_2=2*2=4$ $v_3=3*3=9$ $v_4=4*4=16$ $v_5=5*5=25$ $v_6=6*6=36$ $v_7=7*7=49$ $v_8=8*8=64$ $v_9=9*9=81$ $v_{10}=10*10=100$ $v_{11}=11*11=121$ End Key Generation Start Encryption:

Acquire Plaintext message

Let the plain text message be "hi!"

Convert Plaintext to Integer

Using the ASC II code "hi!" is represented by 104, 105, 33. "9" may be added in front of 2-digit characters to allow for easier encryption and decryption.

Hence, the integer to be encrypted will be "104105933".

Generate Diophantine Equation Based on Symmetric Key

From the above, the values of $v_1$, $v_2$, $v_3$, $v_4$, $v_5$, $v_6$, $v_7$, $v_8$, $v_9$, $v_{10}$, $v_{11}$ are ascertained.

$v_1$, $v_2$, $v_3$, $v_4$, $v_5$, $v_6$, $v_7$, $v_8$, $v_9$, $v_{10}$ will be used as variables in the Diophantine equation and $v_{11}$ will be used as the concealment variable.

Diophantine equations generated:

$$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785015$$

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785015$$

End of Encryption
Start Decryption:
Acquire Cipher Text $$X^2 = 5v_1^{10005032} + 2(v_2^2)(v_1^{89}) + v_3^2 + v_4^2 + v_5^2 + v_6^2 + v_7^2 + v_8^2 + v_9^2 + v_{10}^3 + 10838045284785015$$

Solve Diophantine Equations Using Symmetric Key
Given the following values,
$y_1=1$, $y_2=2$, $y_3=3$, $y_4=4$, $y_5=5$, $y_6=6$, $y_7=7$, $y_8=8$, $y_9=9$, $y_{10}=10$, $y_{11}=11$
$z_1=1$, $z_2=2$, $z_3=3$, $z_4=4$, $z_5=5$, $z_6=6$, $z_7=7$, $z_8=8$, $z_{10}=10$, $z_{11}=11$ Let $v_n = y_n * z_n$ $v_1 = 1*1 = 1$ $v_2 = 2*2 = 4$ $v_3 = 3*3 = 9$ $v_4 = 4*4 = 16$ $v_5 = 5*5 = 25$ $v_6 = 6*6 = 36$ $v_7 = 7*7 = 49$ $v_8 = 8*8 = 64$ $v_9 = 9*9 = 81$ $v_{10} = 1010 = 100$ $v_{11} = 11*11 = 121$ Using the symmetric key, the following is obtained:
$X^2 = 10838045285800368$ (At this stage, the Diophantine equation is not yet solved as X from the above results in a non-integer value.)

Adding the concealment variable $v_{11}=121$ to the right hand side of the equation, the following is obtained:
$X^2 = 10838045285800489$
$X = 104105933$ (At this stage, the Diophantine equation is solved as X is an integer value)
Generate Message Integer
From the above, $X = 104105933$
Convert Integer to Message
Based on the ASC II code 104,105, 33, the message "hi!" is ascertained.
End of Decryption Example (Involving Integer Partitioning)

Key Generation:
Receive Command to Generate Key
Create 14 random integers denoted by
($y_1$, $y_2$, $y_3$, $y_4$, $y_5$, $y_6$, $y_7$, $z_1$, $z_2$, $z_3$, $z_4$, $z_5$, $z_6$, $z_7$)

Let $v_n = y_n + (10)^{z_n}$ where $v_n$ is the variable to the Diophantine equation.
Generate Random Integers
In this example,
$y_1=1$, $y_2=2$, $y_3=3$, $y_4=4$, $y_5=5$, $y_6=6$, $y_7=7$
$z_1=1$, $z_2=2$, $z_3=3$, $z_4=4$, $z_5=5$, $z_6=6$, $z_7=7$, $v_1 = 1 + 10^1 = 11$ $v_2 = 2 + 10^2 = 102$ $v_3 = 3 + 10^3 = 1003$ $v_4 = 4 + 10^4 = 10004$ $v_5 = 5 + 10^5 = 100005$ $v_6 = \$ + 10^6 = 1000006$ $v_7 = 7 + 10^7 = 10000007$ Check that Integers Fulfil Parameters
End Key Generation
Start Encryption:
Acquire Plaintext Message
Let the plain text message be "hi!"
Convert Plaintext to Integer
Using the ASC II code "hi!" is represented by 104, 105, 33, "9" may be added in front of 2-digit characters to allow for easier encryption and decryption.
Hence, the integer to be encrypted will be "104105933".
Partition Integer Based on Relatively Prime Coordinates
3 random relatively prime integers are selected:
$p_1 = 512$
$p_2 = 729$
$p_3 = 1953125$ 104105933 mod 512 = 461

104105933 mod 729 = 359

104105933 mod 1953125 = 590308

Generate Diophantine Equation Based on Symmetric Key
From the above, the values of $v_1$, $v_2$, $v_3$, $v_4$, $v_5$, $v_6$, $v_7$ are ascertained.

$v_1$, $v_2$, $v_3$, $v_4$, $v_5$, $v_6$, $v_7$ will be used as variables in the Diophantine equation
Diophantine Equations Generated:

$$v_1 X = 11[A(v_7 - 10v_6 + v_5 - 10v_4 + v_3 - 4v_2 + v_1 - 6) + 4v_2 + 5(v_1)^2 - 552]$$

$$v_1 X = 11[B(v_7 - 10v_6 + v_5 - 10v_4 + v_3 - 10v_2 + (v_1)^2 + 713) + 3(v_1)^2 - 4]$$

$$v_1 X = 11[C(v_7 - 10v_6 + v_5 - 10v_4 + v_3 - 10v_2 + 1000(v_1)^3 + 622230) + (v_3)^2 - 415701]$$

In this example, 3 new random variables A, B, C are generated

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $$v_1X=11[A(v_7-10v_6+v_5-10v_4+v_3-4v_2+v_1-6)+4v_2+5(v_1)^2-552]$$

$$v_1X=11[B(v_7-10v_6+v_5-10v_4+v_3-10v_2+(v_1)^2+713)+3(v_1)^2-4]$$

$$v_1X=11[C(v_7-10v_6+v_5-10v_4+v_3-10v_2+1000(v_1)^3+622230)+(v_3)^2-415701]$$

End of Encryption

Start Decryption:

Acquire Cipher Text $$v_1X=11[A(v_7-10v_6+v_5-10v_4+v_3-4v_2+v_1-6)+4v_2+5(v_1)^2-552]$$

$$v_1X=11[B(v_7-10v_6+v_5-10v_4+v_3-10v_2+(v_1)^2+713)+3(v_1)^2-4]$$

$$v_1X=11[C(v_7-10v_6+v_5-10v_4+v_3-10v_2+1000(v_1)^3+622230)+(v_3)^2-415701]$$

Solve Diophantine Equations Using Symmetric Key and Cipher Dependent Variable

Given the following values, $$v_1=1+10^1=11$$

$$v_2=2+10^2=102$$

$$v_3=3+10^3=1003$$

$$v_4=4+10^4=10004$$

$$v_5=5+10^5=100005$$

$$v_6=6+10^6=1000006$$

$$v_7=7+10^7=10000007$$

Using the symmetric key, the following is obtained:

$$X=A(512)+461$$

$$X=B(729)+359$$

$$X=C(1953125)+590308$$

Generate Message integer

From solving the equations using integer de-partitioning, $X=104105933$.

Convert Integer to Message

Based on the ASC II code 104, 105, 33, the message "hi!" is ascertained.

End of Decryption

Example (Involving Cipher Text Dependent Variable, Concealment Variable, and Integer Partitioning)

Key Generation:

Receive Command to Generate Key

Create 20 random integers denoted by $(y_1, y_2, y_3, y_4, y_5, y_6, y_7, y_8, y_9, y_{10}, z_1, z_2, z_3, z_4, z_5, z_6, z_7, z_8, z_9, z_{10})$ Let $v_n=y_n+(K_n)^{z_n}$ where $K_n$ is the cipher dependent variable and $v_n$ is the variable to the Diophantine equation.

Generate Random Integers

In this example, $K_1=K_2=K_3=K_4=K_5=K_6=K_7=K_8=K_9=K_{10}=10$ $y_1=1, y_2=2, y_3=3, y_4=4, y_5=5, y_6=6, y_7=7, y_8=8, y_9=9, y_{10}=10$ $z_1=1, z_2=2, z_3=3, z_4=4, z_5=5, z_6=6, z_7=7, z_8=8, z_9=9, z_{10}=10$ $$v_1=1+10^1=11$$

$$v_2=2+10^2=102$$

$$v_3=3+10^3=1003$$

$$v_4=4+10^4=10004$$

$$v_5=5+10^5=100005$$

$$v_6=6+10^6=1000006$$

$$v_7=7+10^7=10000007$$

$$v_8=8+10^8=100000008$$

$$v_9=9+10^9=1000000009$$

$$v_{10}=10+10^{10}=10000000010$$

Check that Integers Fulfil Parameters

End Key Generation

Start Encryption:

Acquire Plaintext Message

Let the plain text message be "hi!"

Convert Plaintext to Integer

Using the ASC II code "hi!" is represented by 104, 105, 33. "9" may be added in front of 2-digit characters to allow for easier encryption and decryption.

Hence, the integer to be encrypted will be "104105933".

Partition Integer Based on Relatively Prime Coordinates 3 random relatively prime integers are selected:

$p_1=512$
$p_2=729$
$p_3=1953125$ $104105933 \bmod 512=461$ $104105933 \bmod 729=359$ $104105933 \bmod 1953125=590308$ Generate Diophantine Equation Based on Symmetric Key and Cipher Dependent Variables From the above, the values of $v_1$, $v_2$, $v_3$, $v_4$, $v_5$, $v_6$, $v_7$, $v_8$, $v_9$, $v_{10}$ are ascertained.

$v_1$, $v_2$, $v_3$, $v_4$, $v_5$, $v_6$, $v_7$ will be used as variables in the Diophantine equation $v_8$, $v_9$, $v_{10}$ will be concealment variables, i.e. variables used to conceal the true Diophantine equation Diophantine equations generated:

$$v_1 X = 11[A(v_7-10v_6+v_5-10v_4+v_3-4v_2+v_1-100000014)+4v_2+5(v_1)^2-552]$$

$$v_1 X = 11[B(v_7-10v_6+v_5-10v_4+v_3-10v_2+(v_1)^2-999999296)+3(v_1)^2-4]$$

$$v_1 X = 11[C(v_7-10v_6+v_5-10v_4+v_3-10v_2+1000(v_1)^3-9999377780)+(v_3)^2-415701]$$

In this example, 3 new random variables A, B, C are generated, each equation is concealed by subtracting $v_1 \cdot A \cdot v_8$, $v_1 \cdot B \cdot v_9$ and $v_1 \cdot C \cdot v_{10}$ respectively.

Artificial Intelligence

Based on historical and known methods to solve Diophantine equations, a prediction is made on insolvability or solvability of the above equation.

If the above Diophantine equation can be solved or predicted as solvable, a replacement Diophantine equation is generated. If the above Diophantine equation is predicted as insolvable, it will be used as cipher text.

Output Cipher Text $$v_1 X = 11[A(v_7-10v_6+v_5-10v_4+v_3-4v_2+v_1-100000014)+4v_2+5(v_1)^2-552]$$

$$v_1 X = 11[B(v_7-10v_6+v_5-10v_4+v_3-10v_2+(v_1)^2-999999296)+3(v_1)^2-4]$$

$$v_1 X = 11[C(v_7-10v_6+v_5-10v_4+v_3-10v_2+1000(v_1)^3-9999377780)+(v_3)^2-415701]$$

Note: the cipher text dependent variable, K, did not change value.

End of Encryption

Start Decryption:

Acquire Cipher Text $$v_1 X = 11[A(v_7-10v_6+v_5-10v_4+v_3-4v_2+v_1-100000014)+4v_2+5(v_1)^2-552]$$

$$v_1 X = 11[B(v_7-10v_6+v_5-10v_4+v_3-10v_2+(v_1)^2-999999296)+3(v_1)^2-4]$$

$$v_1 X = 11[C(v_7-10v_6+v_5-10v_4+v_3-10v_2+1000(v_1)^3-9999377780)+(v_3)^2-415701]$$

Note: the cipher dependent variable, K, did not change value.

Solve Diophantine Equations Using Symmetric Key and Cipher Dependent Variable

Given the following values, $$v_1 = 1+10^1 = 11$$

$$v_2 = 2+10^2 = 102$$

$$v_3 = 3+10^3 = 1003$$

$$v_4 = 4+10^4 = 10004$$

$$v_5 = 5+10^5 = 100005$$

$$v_6 = 6+10^6 = 1000006$$

$$v_7 = 7+10^7 = 10000007$$

$$v_8 = 8+10^8 = 100000008$$

$$v_9 = 9+10^9 = 1000000009$$

$$v_{10} = 10+10^{10} = 10000000010$$

The true Diophantine equations are obtained by adding the concealed variables $(v_1)(A)v_8$, $(v_1)(a)v_9$, $(v_1)(C)v_{10}$ to the respective equations:

$$v_1 X = 11[A(v_7-10v_6+v_5-10v_4+v_3-4v_2+v_1-100000014)+4v_2+5(v_1)^2-552]+(v_1)(A)v_8$$

$$v_1 X = 11[B(v_7-10v_6+v_5-10v_4+v_3-10v_2+(v_1)^2-999999296)+3(v_1)^2-4]+(v_1)(B)v_9$$

$$v_1 X = 11[C(v_7-10v_6+v_5-10v_4+v_3-10v_2+1000(v_1)^3-9999377780)+(v_3)^2-415701]+(v_1)(C)v_{10}$$

Using the symmetric key and cipher dependent generated variable K, the following is obtained:

$$X = A(512)+461$$

$$X = B(729)+359$$

$$X = C(1953125)+590308$$

Generate Message Integer

From solving the equations using integer de-partitioning, X=104105933.

Convert Integer to Message

Based on the ASC II code 104, 105, 33, the message "hi!" is ascertained.

End of Decryption

Embodiments of the invention provide several advantages including but not limited to the following:

Cryptography security is improved by the use of undecidable encryption (e.g. insolvable Diophantine equation(s), faux Diophantine equation(s) (which conceal true Diophantine equation(s) and thereby rendering the solution less obvious), concealment variable (which conceal true Diophantine equation(s) and thereby rendering the solution less obvious), cipher text dependent variable (which removes bounds of variables), and/or integer partitioning (which conceals an original plain text).

Furthermore, prior cryptology method and apparatus, such as in US 2006/0251247 A1 (Akiyama et al.), generally have not utilised artificial intelligence. Recent development and advances in artificial intelligence research has opened the possibility of its usage across various fields, some of these recent developments include the use of artificial intelligence in the field of mathematics, according to "Deep learning for symbolic mathematics" by Facebook Artificial Intelligence Researchers (Lample & Charton, 2020). In embodiments of the invention, the use of artificial intelligence enables exclusion of any class of Diophantine equations which has been solved or is known to be solvable in encryption and automatic improvement through learning from training data, including new and updated data, and improving prediction with experience or training.

It is to be appreciated that the flow charts showing logic flows are representative of exemplary methodologies for performing novel aspects of the invention. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The flow charts showing logic flow may be implemented in software, firmware, hardware, or any combination thereof. In software and firmware embodiments, the logic flow may be implemented by computer executable instructions or code stored on a non-transitory computer readable medium or machine readable medium, such as an optical, magnetic or semiconductor storage. The computer-executable instructions are configured to direct at least one computer processor to perform the logic flow. The embodiments are not limited in this context.

It is to be appreciated that the apparatuses described herein are representative of exemplary apparatuses for performing novel aspects of the invention. Those skilled in the art will understand and appreciate that the apparatuses are not limited by their elements described herein. In any of the apparatuses described herein, it may comprise at least one memory unit and at least one processor communicably coupled thereto. The at least one processor may be any type of computer processor, such as a microprocessor, an embedded processor, a digital signal processor (DSP), a network processor, a multi-core processor, a single core processor, or other device configured to execute code or computer-executable instructions to perform or implement the flowcharts, algorithms, processes, or operations detailed herein. The at least one memory unit may be a non-transitory computer readable medium or machine readable medium for storing or comprising the code or computer-executable instructions. Examples include, but are not limited to, random access memory (RAM), read only memory (ROM), logic blocks of a field programmable gate array (FPGA), erasable programmable read only memory (EPROM), and electrically erasable programmable ROM (EEPROM).

It is to be understood that the embodiments and features described above should be considered exemplary and not restrictive. Many other embodiments will be apparent to those skilled in the art from consideration of the specification and practice of the invention. Furthermore, certain terminology has been used for the purposes of descriptive clarity, and not to limit the disclosed embodiments of the invention.

The invention claimed is:

1. An encryption method comprising:
receiving at least one plain text;
converting the at least one plain text to at least one pre-encryption integer ($M_1, \ldots, M_n$);
using the at least one pre-encryption integer ($M_1, \ldots, M_n$) and at least one variable solution set ($v_1, \ldots, v_n$) derived from at least one symmetric key, generating at least one Diophantine equation solvable by the at least one variable solution set ($v_1, \ldots, v_n$), including:
using a first subset of the at least one variable solution set ($v_1, \ldots, v_n$), generating at least one initial Diophantine equation; and
using a concealment variable derived from a second subset of the at least one variable solution set ($v_1, \ldots, v_n$), modifying the at least one initial Diophantine equation to generate the at least one Diophantine equation;
predicting, using a trained AI model, insolvability or solvability of the at least one Diophantine equation; and
providing the at least one Diophantine equation as at least one cipher text if the at least one Diophantine equation is predicted, by the trained AI model, as insolvable.

2. The encryption method of claim 1, further comprising:
providing at least one replacement Diophantine equation and a subset of the at least one Diophantine equation as a cipher text if any one of the at least one Diophantine equation, which is other than the subset of the at least one Diophantine equation, is predicted as solvable by the trained AI model and if the at least one replacement Diophantine equation is predicted as insolvable by the trained AI model, including:
generating the at least one replacement Diophantine equation, and predicting, using the trained AI model, insolvability or solvability of the at least one replacement Diophantine equation.

3. The encryption method of claim 1, further comprising:
using the at least one variable solution set ($v_1, \ldots, v_n$), generating at least one faux Diophantine equation; and
ascertaining a solution of the at least one faux Diophantine equation as a non-integer, wherein predicting, using the trained AI model, insolvability or solvability of the at least one Diophantine equation includes:
predicting, using the trained AI model, insolvability or solvability of the at least one faux Diophantine equation,
wherein providing the at least one Diophantine equation as the at least one cipher text if the at least one Diophantine equation is predicted, by the trained AI model, as insolvable includes:
providing the at least one faux Diophantine equation as a faux cipher text of the at least one cipher text if the at least one faux Diophantine equation is predicted, by the trained AI model, as insolvable.

4. The encryption method of claim 1, wherein each variable of the at least one variable solution set is further derived from a cipher text dependent variable.

5. The encryption method of claim 4, wherein the cipher text dependent variable is based on a coefficient of a variable in a Diophantine equation of a previous cipher text, wherein the variable in the Diophantine equation of the previous cipher text includes a polynomial degree based on a previous cipher text dependent variable.

6. The encryption method of claim 1, wherein using the concealment variable derived from the second subset of the at least one variable solution set ($v_1, \ldots, v_n$), modifying the at least one initial Diophantine equation to generate the at least one Diophantine equation includes:
performing addition, subtraction, multiplication, and/or division on the at least one initial Diophantine equation with the concealment variable.

7. The encryption method of claim 1,
wherein using the at least one pre-encryption integer ($M_1, \ldots, M_n$) and at least one variable solution set ($v_1, \ldots, v_n$) derived from at least one symmetric key, generating at least one Diophantine equation solvable by the at least one variable solution set ($v_1, \ldots, v_n$) includes:
using a plurality of relatively prime integers, partitioning the at least one pre-encryption integer ($M_1, \ldots, M_n$) into a plurality of partitioned integers; and
using the partitioned integers, generating a plurality of Diophantine equations of the at least one Diophantine equation, wherein a count of the relatively prime integers, a count of the partitioned integers, and a count of the Diophantine equations are equivalent.

8. The encryption method of claim 7, wherein partitioning the at least one pre-encryption integer ($M_1, \ldots, M_n$) into the partitioned integers includes:
   performing a plurality of modulo operations using the at least one pre-encryption integer ($M_1, \ldots, M_n$) and the relatively prime integers being a plurality of divisors, and deriving therefrom the partitioned integers being a plurality of remainders.

9. An encryption apparatus comprising:
   at least one memory unit for storing computer-executable instructions; and
   at least one processor communicably coupled to the at least memory unit and configured to: execute the computer-executable instructions to perform the method according to claim 1.

10. A non-transitory, computer readable medium comprising computer-executable instructions configured to direct at least one computer processor to perform the method according to claim 1.

11. An encryption apparatus comprising:
   a plain text input unit configured to receive at least one plain text;
   a symmetric key input unit configured to receive at least one symmetric key;
   a plain text to integer unit communicably coupled to the plain text input unit and configured to: receive the at least one plain text from the plain text input unit and convert the at least one plain text to at least one pre-encryption integer ($M_1, \ldots, M_n$);
   a polynomial generation unit communicably coupled to the symmetric key unit and configured to: receive the at least one symmetric key from the symmetric key unit and derive at least one variable solution set ($v_1, \ldots, v_n$) using the at least one symmetric key;
   an encryption unit communicably coupled to the plain text to integer unit, the polynomial generation unit, wherein the encryption unit is configured to: receive the at least one variable solution set ($v_1, \ldots, v_n$) from the polynomial generation unit, and generate at least one Diophantine equation solvable by the at least one variable solution set ($v_1, \ldots, v_n$) using the at least one pre-encryption integer ($M_1, \ldots, M_n$) and the at least one variable solution set ($v_1, \ldots, v_n$) by being configured to: generate at least one initial Diophantine equation using a first subset of the at least one variable solution set ($v_1, \ldots, v_n$), and modify the at least one initial Diophantine equation using a concealment variable which is derived from a second subset of the at least one variable solution set ($v_1, \ldots, v_n$); and
   an AI unit communicably coupled to the encryption unit and configured to: receive the at least one Diophantine equation, the AI unit having a trained AI model configured to: predict insolvability or solvability of the at least one Diophantine equation,
   wherein the encryption unit is further communicably coupled to a cipher text output unit and configured to: provide the at least one Diophantine equation as at least one cipher text to the cipher text output unit if the at least one Diophantine equation is predicted as insolvable by the AI model.

12. The encryption apparatus of claim 11, wherein
   the encryption unit is configured to: generate at least one replacement Diophantine equation if any one of the at least one Diophantine equation is predicted as solvable by the trained AI model;
   the AI unit is configured to: predict insolvability or solvability of the at least one replacement Diophantine equation; and
   the encryption unit is configured to: provide the at least one replacement Diophantine equation and a subset of the at least one Diophantine equation, which is other than the any one of the at least one Diophantine equation which is predicted as solvable by the trained AI model, as at least one cipher text to the cipher text output unit.

13. The encryption apparatus of claim 11, wherein
   the encryption unit is configured to: generate at least one faux Diophantine equation using the at least one variable solution set ($v_1, \ldots, v_n$); and
   ascertain a solution of the at least one faux Diophantine equation as a non-integer, wherein the AI unit is configured to: receive the at least one faux Diophantine equation, and the AI model is configured to: predict insolvability or solvability of the at least one faux Diophantine equation, and
   wherein the encryption unit is configured to: provide the at least one faux Diophantine equation as a faux cipher text to the cipher text output unit if the solution of the at least one faux Diophantine equation is a non-integer.

14. The encryption apparatus of claim 11, further comprising: a cipher text dependent variable unit communicably coupled to the encryption unit, wherein
   the cipher text dependent variable unit is configured to: provide a cipher text dependent variable to the polynomial generation unit; and
   the polynomial generation unit is configured to: derive the at least one variable solution set ($v_1, \ldots, v_n$) using the at least one symmetric key by being configured to: further derive the at least one variable solution set ($v_1, \ldots, v_n$) using the cipher text dependent variable.

15. The encryption apparatus of claim 14, wherein
   the cipher text dependent variable unit is configured to: ascertain the cipher text dependent variable based on a coefficient of a variable in a Diophantine equation of a previous cipher text, wherein the variable in the Diophantine equation of the previous cipher text includes a polynomial degree based on a previous cipher text dependent variable.

16. The encryption apparatus of claim 11, wherein
   the encryption unit is configured to: modify the at least one initial Diophantine equation using the concealment variable which is derived from the second subset of the at least one variable solution set ($v_1, \ldots, v_n$) by being configured to: perform addition, subtraction, multiplication, and/or division on the at least one initial Diophantine equation with the concealment variable.

17. The encryption apparatus of claim 11, wherein
   the plain text to integer unit includes an integer partitioning unit configured to:
   partition the at least one pre-encryption integer ($M_1, \ldots, M_n$) into a plurality of partitioned integers using a plurality of relatively prime integers;
   the encryption unit is configured to: generate the at least one Diophantine equation solvable by the at least one variable solution set ($v_1, \ldots, v_n$) using the at least one pre-encryption integer ($M_1, \ldots, M_n$) and the at least one variable solution set ($v_1, \ldots, v_n$) by being configured to:
   generate a plurality of Diophantine equations of the at least one Diophantine equation using the at least one pre-encryption integer ($M_1, \ldots, M_n$), the at least one variable solution set ($v_1, \ldots, v_n$), and the partitioned integers,
   wherein a count of the relatively prime integers, a count of the partitioned integers, and a count of the Diophantine equations are equivalent.
18. The encryption apparatus of claim 17, wherein
the integer partitioning unit is configured to: partition the at least one pre-encryption integer into the partitioned integers based on the relatively prime integers by being configured to: perform a plurality of modulo operations using the at least one pre-encryption integer ($M_1, \ldots, M_n$), the relatively prime integers as a plurality of divisors, and deriving therefrom the partitioned integers being a plurality of remainders.
19. A decryption method comprising:
receiving at least one cipher text which includes at least one Diophantine equation;
using a symmetric key, deriving at least one variable solution set ($v_1, \ldots, v_n$) for solving the at least one Diophantine equation;
using the at least one variable solution set ($v_1, \ldots, v_n$), solving the at least one Diophantine equation to ascertain at least one pre-encryption integer including:
   using a first subset of the at least one variable solution set ($v_1, \ldots, v_n$), ascertaining the at least one initial integer; and
   using a concealment variable derived from a second subset of the at least one variable solution set ($v_1, \ldots, v_n$), modifying the at least one initial integer to ascertain the at least one pre-encryption integer ($M_1, \ldots, M_n$); and
converting the at least one pre-encryption integer ($M_1, \ldots, M_n$) to at least one plain text.
20. The decryption method of claim 19, wherein using the at least one variable solution set ($v_1, \ldots, v_n$), solving the at least one Diophantine equation to ascertain the at least one pre-encryption integer ($M_1, \ldots, M_n$) includes:
   ascertaining the at least one integer ($M_1, \ldots, M_n$) and at least one non-integer from different Diophantine equations of the at least one Diophantine equation to ascertain one of the different Diophantine equations corresponding to the at least one non-integer as a faux Diophantine equation.
21. The decryption method of claim 19, wherein using symmetric key, deriving the at least one variable solution set ($v_1, \ldots, v_n$) for solving the at least one Diophantine equation includes:
   using the symmetric key and a cipher text dependent variable, deriving the at least one variable solution set ($v_1, \ldots, v_n$).
22. The decryption method of claim 21, wherein the cipher text dependent variable is based on a coefficient of a variable in a Diophantine equation of a previous cipher text, wherein the variable in the Diophantine equation of the previous cipher text includes a polynomial degree based on a previous cipher text dependent variable.
23. The decryption method of claim 19, wherein using the concealment variable derived from the second subset of the at least one variable solution set ($v_1, \ldots, v_n$), modifying the at least one initial integer to ascertain the at least one pre-encryption integer ($M_1, \ldots, M_n$) includes:
   performing addition, subtraction, multiplication, and/or division on the at least one Diophantine equation with the concealment variable.
24. The decryption method of claim 19, wherein using the at least one variable solution set ($v_1, \ldots, v_n$), solving the at least one Diophantine equation to ascertain the at least one pre-encryption integer ($M_1, \ldots, M_n$) includes:
   using the at least one variable solution set ($v_1, \ldots, v_n$), solving a plurality of Diophantine equations of the at least one Diophantine equation to ascertain a plurality of partitioned integers; and
   using a plurality of relatively prime integers and the partitioned integers, ascertaining the at least one pre-encryption integer ($M_1, \ldots, M_n$),
   wherein a count of the relatively prime integers, a count of the partitioned integers, and a count of the Diophantine equations are equivalent.
25. The decryption method of claim 24, wherein using the relatively prime integers and the partitioned integers, ascertaining the at least one pre-encryption integer ($M_1, \ldots, M_n$) includes:
   de-partitioning the partitioned integers by performing a plurality of Euclidean algorithm operations using the partitioned integers as a plurality of remainders and the relatively prime integers as a plurality of quotients, and deriving therefrom at least one pre-encryption integer ($M_1, \ldots, M_n$).
26. A decryption apparatus comprising:
at least one memory unit for storing computer-executable instructions; and
at least one processor communicably coupled to the at least memory unit and configured to:
execute the computer-executable instructions to perform the method according to claim 19.
27. A non-transitory, computer readable medium comprising computer-executable instructions configured to direct at least one computer processor to perform the method according to claim 19.
28. A decryption apparatus comprising:
a cipher text input unit configured to receive at least one cipher text which includes at least one Diophantine equation;
a symmetric key input unit configured to receive at least one symmetric key;
a decryption unit communicably coupled to the cipher text input unit and the symmetric key input unit, and configured to:
receive the symmetric key from the symmetric key input unit and the at least one Diophantine equation from the cipher text input unit;
using the symmetric key, derive at least one variable solution set ($v_1, \ldots, v_n$) for solving the at least one Diophantine equation;
using the at least one variable solution set ($v_1, \ldots, v_n$), solve the at least one Diophantine equation to ascertain at least one pre-encryption integer ($M_1, \ldots, M_n$) by being configured to:
using a first subset of the at least one variable solution set ($v_1, \ldots, v_n$), ascertain at least one initial integer;
using a concealment variable derived from a second subset of the at least one variable solution set ($v_1, \ldots, v_n$), modify the at least one initial integer to ascertain the at least one pre-encryption integer ($M_1, \ldots, M_n$); and
an integer to plain text unit communicably coupled to the decryption unit and configured to:
receive the at least one pre-encryption integer ($M_1, \ldots, M_n$) from the decryption unit, and convert the at least one pre-encryption integer ($M_1, \ldots, M_n$) to at least one plain text.

29. The decryption apparatus of claim 28, wherein
the decryption unit is configured to: using the at least one variable solution set $(v_1, \ldots, v_n)$, solve the at least one Diophantine equation to ascertain the at least one pre-encryption integer $(M_1, \ldots, M_n)$ by being configured to: ascertain the at least one integer $(M_1, \ldots, M_n)$ and at least one non-integer from different Diophantine equations of the at least one Diophantine equation to ascertain one of the different Diophantine equations as a faux Diophantine equation.

30. The decryption apparatus of claim 28, wherein
the decryption unit is configured to: using the symmetric key, derive the at least one variable solution set $(v_1, \ldots, v_n)$ for solving the at least one Diophantine equation by being configured to: using the symmetric key and a cipher text dependent variable, derive the at least one variable solution set $(v_1, \ldots, v_n)$.

31. The decryption apparatus of claim 30, wherein the cipher text dependent variable is based on a coefficient of a variable in a Diophantine equation of a previous cipher text, wherein the variable in the Diophantine equation of the previous cipher text includes a polynomial degree based on a previous cipher text dependent variable.

32. The decryption apparatus of claim 28, wherein
the decryption unit is configured to: using the concealment variable derived from the second subset of the at least one variable solution set $(v_1, \ldots, v_n)$, modify the at least one initial integer to ascertain the at least one pre-encryption integer $(M_1, \ldots, M_n)$ by being configured to: perform addition, subtraction, multiplication, and/or division on the at least one Diophantine equation with the concealment variable.

33. The decryption apparatus of claim 28, wherein
the decryption unit is configured to: using the at least one variable solution set $(v_1, \ldots, v_n)$, solve the at least one Diophantine equation to ascertain the at least one pre-encryption integer $(M_1, \ldots, M_n)$ by being configured to:
using the at least one variable solution set $(v_1, \ldots, v_n)$, solve a plurality of Diophantine equations of the at least one Diophantine equation to ascertain a plurality of partitioned integers; and
using a plurality of relatively prime integers and the partitioned integers, ascertain the at least one pre-encryption integer $(M_1, \ldots, M_n)$,
wherein a count of the relatively prime integers, a count of the partitioned integers, and a count of the Diophantine equations are equivalent.

34. The decryption apparatus of claim 33, wherein the integer to plain text unit includes an integer de-partitioning unit, wherein
the integer de-partitioning unit is configured to:
receive the partitioned integers from the decryption unit, and de-partition the partitioned integers by performing a plurality of Euclidean algorithm operations using the partitioned integers as a plurality of remainders and the relatively prime integers as a plurality of quotients, and deriving therefrom at least one pre-encryption integer $(M_1, \ldots, M_n)$.

* * * * *